United States Patent

Takeuchi et al.

[11] Patent Number: 5,965,250
[45] Date of Patent: Oct. 12, 1999

[54] MODIFIED POROUS NON-CONDUCTOR

[75] Inventors: Yasushi Takeuchi; Masaaki Kawabe; Hiroaki Yamazaki; Kazuya Sato, all of Ibaraki, Japan

[73] Assignee: Japan Vilene Company, Ltd., Tokyo, Japan

[21] Appl. No.: 09/087,872

[22] Filed: Jun. 2, 1998

Related U.S. Application Data

[62] Division of application No. 08/840,021, Apr. 24, 1997, Pat. No. 5,792,517.

[30] Foreign Application Priority Data

Apr. 25, 1996 [JP] Japan .................................. 8-129159

[51] Int. Cl.$^6$ ....................................................... B05D 5/12
[52] U.S. Cl. .......................... 428/308.4; 427/580; 427/58
[58] Field of Search ..................... 427/230, 444, 427/540, 580; 428/308.4

[56] References Cited

U.S. PATENT DOCUMENTS 3,779,882 12/1973 Rosenthal .
4,430,398 2/1984 Kujas .
5,792,517 8/1998 Takeuchi et al. .................. 427/540 X

FOREIGN PATENT DOCUMENTS 0311198 4/1989 European Pat. Off. .
0467639 1/1992 European Pat. Off. .
1297338 6/1969 Germany .

OTHER PUBLICATIONS

WO 84/03193 (PCT/US84/00149), Aug. 16, 1984.
Derwent Abstract AN 95–221499, May 1995.
Derwent Abstract AN 78–50487A, Jun. 1978.

*Primary Examiner*—Erma Cameron
*Attorney, Agent, or Firm*—Burgess, Ryan & Wayne

[57] ABSTRACT

A modified porous non-conductor is provided wherein its outer and inner, surfaces have been treated by placing the porous non-conductor between a pair of electrodes which are located opposite to each other and carry a dielectric layer on a surface facing the other electrode, respectively, so that the porous non-conductor is brought into contact with both dielectric layers without coming into contact with the electrodes; and then, applying an alternating current voltage having a frequency of about 0.1 Khz to about 100 Khz between the electrodes to thereby induce an electric discharge in voids contained in the porous non-conductor and sandwiched between a pair of the electrodes.

5 Claims, 9 Drawing Sheets

MODIFIED POROUS NON-CONDUCTOR

This is a division of application Ser. No. :08/840,021, now U.S. Pat No. 5,792,517 filed Apr. 24, 1997 by Yasushi TAKEUCHI, et al for PROCESS FOR TREATING THE OUTER-INNER SURFACES OF A POROUS NON-CONDUCTOR AND THE MODIFIED POROUSNON-CONDUCTOR.

BACKGROUND OF THE INVENTION

1. Field of the Invention

The present invention relates to a process for treating the outer-inner surfaces of a porous non-conductor or an electrically-non-conductive porous article, and a modified porous non-conductor or a modified electrically-non-conductive porous article. According to the present invention, for example, hydrophilic, hydrophobic or adhesive properties may be imparted to the outer-inner surfaces of a porous non-conductor, such properties may be enhanced, or a roughening of the outer-inner surfaces of a porous non-conductor may be obtained.

2. Description of the Related Art

Hitherto, for example, an alternating current (AC) or direct current (DC) corona discharge, or a low-pressure or atmospheric-pressure glow discharge has been used, when treating a surface of a porous or non-porous non-conductive material with an electric discharge.

In a process using an AC corona discharge, an article to be treated is brought into contact with a surface of a dielectric layer disposed on a counter electrode or an inducing electrode, such as a plane electrode. A discharge electrode, such as a wire or needle electrode, is spaced apart from the article to be treated at a predetermined interval, generally about 1 mm to several millimeters. Then, an AC high-voltage is applied between the discharge electrode and the counter electrode, in air or an other gas, whereby the surface of the article is treated with a linear corona emitted from the discharge electrode. A dielectric layer is generally disposed between the counter electrode and the article to be treated, to stabilize the emitted linear corona. A suitable gas may be selected in accordance with the functional groups to be introduced to the surface of the article. The surface of the article may be also treated, using a DC corona discharge caused by applying a DC high-voltage instead of the AC high-voltage.

In the above process, more than a certain degree of an electric intensity between the discharge electrode and the counter electrode must be produced, namely, a high-voltage sufficient to initiate the corona discharge, to generate the corona discharge. If the voltage applied is too high, however, a spark discharge between the electrodes may occur through weak portions of the article to be treated, to thereby damage the article, for example, by producing large holes therein. When an article having a rugged or rough surface is treated, a uniform discharge cannot be obtained, and therefore, a uniform treatment of the surface is not obtained, and the article may be damaged, for example, by the producing of holes therein. Further, the gas used has a considerable affect on the stability of the discharge. Some gases cannot generate a stable discharge, and thus, the required treatment may not be obtained.

In a process using a low-pressure glow discharge, a pair of electrodes are positioned separate from and opposite to each other in a discharge chamber in which a vaccum has been obtained. The article to be treated is located between the electrodes, and then the pressure of air or other gas in the chamber is reduced to about $10^{-2}$ Torr to about 10 Torr. An AC voltage of generally several kilohertzs (KHz) to several megahertzs (MHz) is applied between the electrodes, to generate a glow discharge, and the surface of the article is treated therewith. In this process, the AC voltage is applied while the article is not in contact with the electrodes or is in contact with only one of the electrodes. Further, intervals between the electrodes will facilitate the discharge under a reduced pressure, as apparent from Paschen's law, and thus the electrodes can be positioned farther apart than those used in the above process using the AC corona discharge. Under a reduced pressure, very little inactivation of ionized chemical species occurs, with a corresponding reduction of the spark discharge. Therefore, more gases may be used, in comparison with the above process using the AC corona discharge.

The process requires a vaccum apparatus to reduce the pressure in the discharge chamber, and thus is not suitable for a continuous treatment. When an article containing volatile materials, such as water or a plasticizing agent, is treated, it is difficult to control the pressure to one suitable therefor. Further, when a porous article is treated using the low-pressure glow discharge, a discharge cannot occur in small pores, such as pores having a pore size of less than 0.1 mm, in the presence of some gases or under some degrees of reduced pressure, in accordance with Paschen's law. Therefore, an article having surfaces with such small pores cannot be treated.

In a process using an atmospheric-pressure glow discharge, as disclosed in, for example, Kogyo-Kanetsu (Engineering Heating), Vol. 27, No. 1, 1990, a pair of electrodes are positioned separate from and opposite to each other at a predetermined distance (generally, several millimeters) in a discharge chamber which may be sealed. An AC voltage of several kilohertzs (KHz) to several tens of megahertzs (MHz) is applied between the electrodes, while a gas mixture containing one or more rare gases, particularly helium, as a main component, with one or more predetermined reactive gases used to introduce one or more functional groups, is supplied into the discharge chamber. The surface of the article is treated by the glow discharge generated between the electrodes. In this process, a dielectric layer is generally disposed on at least one of the electrodes, to stabilize the generated discharge. Further, the AC voltage is applied while the article is not in contact with the electrodes and/or the dielectric layers, or is in contact with only one of the electrodes and/or the dielectric layers.

This process requires an expensive rare gas to produce a stable generation of the discharge. When the amount of the reactive gases used to introduce the functional groups is increased, the discharge becomes unstable, and thus, the amount of the gases that can be used is limited. The gas mixture may generally contain up to about 10% of the reactive gases. In this process, the discharge occurs only at the portion where the gas flows. When a porous article is treated, the reactive gases cannot easily enter voids in the article. Therefore, it is difficult to treat the surfaces of such voids, and thus it is difficult to uniformly treat the outer-inner surfaces of porous article.

Japanese Unexamined Patent Publication (Kokai) No. 4-74525 discloses a process for a treatment using an atmospheric-pressure glow discharge wherein each of the electrodes located opposite to each other is covered with a dielectric layer. In the process disclosed in Kokai No. 4-74525, an AC voltage is applied while the article is not in contact with the electrodes and/or the dielectric layers, or is in contact with only one of the electrodes and/or the dielectric layers. The above-mentioned Publication does not disclose a process wherein an AC voltage is applied while the article is in direct contact with each of the dielectric layers. Further, the process disclosed in Kokai No. 4-74525 is not operative in air but requires the use of an expensive rare gas as a gas for a stable generating of the discharge.

In the process using the atmospheric-pressure glow discharge, the discharge occurs at the portion where the reactive gas flows. Therefore, it is difficult to uniformly treat the outer-inner surfaces of porous article containing voids, because a treating of the surfaces of voids where the reactive gases do not easily enter is difficult to obtain.

Japanese Unexamined Patent Publication (Kokai) No. 7-119021 discloses an apparatus for a discharge treatment using the atmospheric-pressure glow discharge wherein a pair of cylindrical electrodes covered with a ceramic layer (thickness=0.5 to 2 mm) are disposed in parallel. This apparatus requires an expensive rare gas, more particularly, an atmospheric gas containing mainly a gas mixture of helium and argon. In view of obtaining a stable discharge, the gases which may be used to generate a stable discharge are limited, and the concentration of oxygen is preferably 0.5% or less. The apparatus is not operative in air. Further, the apparatus can treat only the portion in contact with the reactive gases. Therefore, it is difficult to uniformly treat the outer-inner surfaces of porous article containing voids, because a treatment of the surfaces of voids where the reactive gases do not easily enter is difficult to obtain.

SUMMARY OF THE INVENTION

Accordingly, the object of the present invention is to provide a process for treating an outer-inner surface of an electrically non-conductive porous article by an electric discharge, wherein not only the outer surface of the porous article but also the surfaces of voids contained in the porous article can be treated, little damage to the article caused by a spark discharge or the like occurs, any kind of gas may be used, and a continuous treatment can be carried out.

Other objects and advantages will be apparent from the following description.

In accordance with the present invention, there is provided a process for treating the outer-inner surfaces of a porous non-conductor, that is, an electrically non-conductive porous article, comprising the steps of:

placing the porous non-conductor between a pair of electrodes which are located opposite to each other and each carry a dielectric layer on a surface facing the other electrode, respectively, so that the porous non-conductor is brought into contact with both dielectric layers without coming into contact with the electrodes; and then applying an alternating current voltage having a frequency of about 0.1 KHz to about 100 KHz between the electrodes to thereby induce an electric discharge in voids contained in the porous non-conductor sandwiched between a pair of the electrodes.

Further, in accordance with the present invention, there is provided a modified porous non-conductor, that is, a modified electrically non-conductive porous article, wherein an introducing efficiency rate (A/B) of a functional group-introducing efficiency (A) at an exposed surface to which a functional group is introduced, to a functional group-introducing efficiency (B) at an unexposed surface to which a functional group is introduced is less than 1.

The term "outer-inner surfaces" of the porous non-conductor collectively indicates (i) an outer surface of the porous non-conductor to be treated, and (ii) an inner surface of the porous non-conductor to be treated. The term "outer surface" of the porous non-conductor means a surface which is in contact with a hypothetical or virtual smooth surface of a hypothetical or virtual geometrical solid hypothetically circumscribing the porous non-conductor with the hypothetical smooth surface. The term "inner surface" of the porous non-conductor means a surface of a void contained in the hypothetical or virtual geometrical solid hypothetically circumscribing the porous non-conductor with the hypothetical smooth surface. In other words, the inner surface of a foamed porous article means the surfaces of all cells, the inner surface of a porous film means the surfaces of concaved portions, such as depressions or grooves, or through-holes, and the inner surface of a fabric porous article means surfaces of the inner spaces formed by constitutional fibers, that is, the surfaces of the constitutional fibers. The term cell includes open cells and closed cells.

The term "exposed surface" in the outer-inner surfaces of the porous non-conductor means a surface which can be analyzed by X-ray photoelectric spectrophotometry. The term "unexposed surface" in the outer-inner surfaces of the porous non-conductor means a surface other than the exposed surface.

The term "treatment of the outer-inner surfaces" or "treatment of the surfaces" of the porous non-conductor means a chemical or physical treatment of at least a portion of the outer-inner surfaces of the porous non-conductor.

The chemical treatment means a chemical modification of the outer-inner surfaces of the porous non-conductor, for example, an introduction of desired functional groups into the chemical compounds constituting the porous non-conductor. The chemical treatment can impart hydrophilic, hydrophobic or adhesive properties to the outer-inner surfaces of the porous non-conductor, or enhance hydrophilic, hydrophobic or adhesive properties of the outer-inner surfaces of the porous non-conductor. The desired functional groups can be introduced by carrying out the chemical treatment in the presence of a surface-treating gas capable of introducing a desired functional group, to induce a discharge in the inner voids which are contained in the porous non-conductor and circumscribed in the hypothetical geometrical solid.

For example, the hydrophilic properties may be imparted or enhanced by introducing a functional group containing an oxygen atom, from air, oxygen gas, carbon dioxide gas, or carbon monoxide gas. The hydrophobic properties may be imparted or enhanced by introducing a functional group containing a fluorine atom from tetrafluoromethane or the like.

The physical treatment means a physical modification of the outer-inner surfaces of the porous non-conductor, for example, a roughening finishing by a plasma treatment. The roughening finishing may be carried out by generating a discharge in the surface-treating gas, such as air. The chemical and physical treatments may be conducted at the same time. For example, when air is used as the surface-treating gas, the hydrophilic properties of the porous non-conductor may be enhanced, and at the same time, a roughening finishing thereof may be performed. When the physical treatment is carried out, the chemical treatment is generally effected at the same time. When the chemical treatment must be selectively carried out, the treatment conditions, such as the magnitude of the voltage applied, time of application of the voltage, and/or the surface-treating gas used, may be appropriately selected to cause mainly the chemical treatment.

DESCRIPTION OF THE PREFERRED EMBODIMENTS

The present invention will be explained in detail hereinafter, with reference to the drawings.

Figure 1:
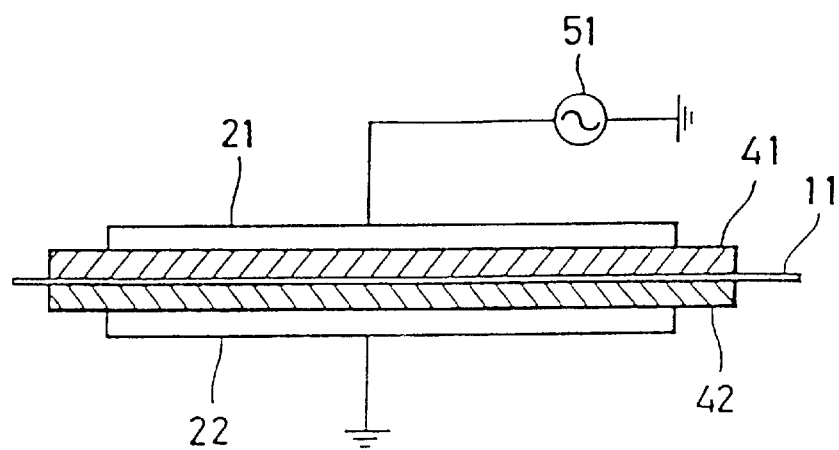
FIG. 1 is a sectional view schematically illustrating an essential principle of the present invention.

An essential principle of the present invention is shown in FIG. 1. A pair of electrodes, such as plane electrodes 21, 22, are located opposite to each other. The electrode 21 carries a dielectric layer 41 on a surface facing the other electrode 22, and the electrode 22 carries a dielectric layer 42 on a surface facing the other electrode 21. The porous non-conductor 11 is placed between the dielectric layers 41, 42 so that the porous non-conductor 11 is brought into direct contact with each of the dielectric layers 41, 42, without coming into contact with the electrodes 21, 22. The electrodes 21, 22 are subjected to a suitable pressure, to thereby ensure that no substantial spaces are formed between the electrode 21 and the dielectric layer 41, the dielectric layer 41 and the porous non-conductor 11, the porous non-conductor 11 and the dielectric layer 42, the dielectric layer 42 and the electrode 22, respectively. Each of the electrodes 21, 22 is preferably smaller in size than each of the dielectric layers 41, 42 in contact with them, as this prevents the occurrence of a spark between the edges of the electrodes 21, 22. When each of the electrodes 21, 22 is the same size as each of the dielectric layers 41, 42 in contact with them, a spark between the electrodes 21, 22 may be prevented by providing a dielectric cover, such as a vinyl tape, around the edges of the electrodes. The electrode 21 is connected to an AC supply 51, and the electrode 22 is grounded.

When a high AC voltage is applied from the AC supply 51, a discharge occurs in the inner voids of the porous non-conductor 11, to thereby generate a plasma. The plasma formed in the inner voids of the porous non-conductor 11 acts on the inner surfaces of the porous non-conductor 11, and thus the inner surfaces of the porous non-conductor 11 are modified. When the voltage is applied, the outer surfaces of the porous non-conductor 11 are brought into close contact with the dielectric layers 41, 42, and theoretically, the plasma formed in the inner voids of the porous non-conductor 11 does not act on the points at which the outer surfaces are in contact with the dielectric layers. Nevertheless, such points of contact actually account for very narrow areas in comparison with the inner surfaces, and therefore, it is considered that all of the outer surfaces are substantially treated. Further, the porous non-conductor is treated not only with the plasma but also with radicals produced by the action of the plasma. When the porous non-conductor is separated from the dielectric layers, the points of contact are treated with the radicals which have remained active because they were not inactivated. In the present invention, the discharge occurs in the inner voids of the porous non-conductor, and thus little damage to the porous non-conductor occurs due to a spark discharge or the like.

In the present invention, the AC voltage applied from the AC supply to generate the discharge varies in accordance with the distance between the electrodes or the kinds of gases, and there is no particular lower limit imposed for the AC voltage. Nevertheless, the AC voltage is preferably 0.25 KVp or more, more preferably 0.5 KVp or more. The term "KVp" means a voltage difference between a maximum peak and 0 of an AC voltage. If the voltage is less than 0.25 KVp, a required discharge cannot be substantially obtained. There is no upper limit imposed for the AC voltage applied, as long as the AC voltage applied does not result in damage to the porous non-conductor.

There is no particular upper limit of the frequency of the AC voltage, but the frequency is preferably 100 KHz or less, more preferably 50 KHz or less. If the frequency is more than 100 KHz, the porous non-conductor may be overheated by a dielectric heating and thus damaged. When the frequency is 50 KHz or less, the porous non-conductor and the electrodes are difficult to heat, and a stable treatment of the porous non-conductor can be successfully carried out for a long time.

A lower limit of the frequency is preferably 0.1 KHz, more preferably 0.5 KHz, most preferably 1 KHz. If the frequency is less than 0.1 KHz, a treatment efficiency by the discharge may be lowered. When the frequency is 1 KHz or more, the treatment efficiency can be successfully improved, and the treatment time can be shortened.

Figure 4:
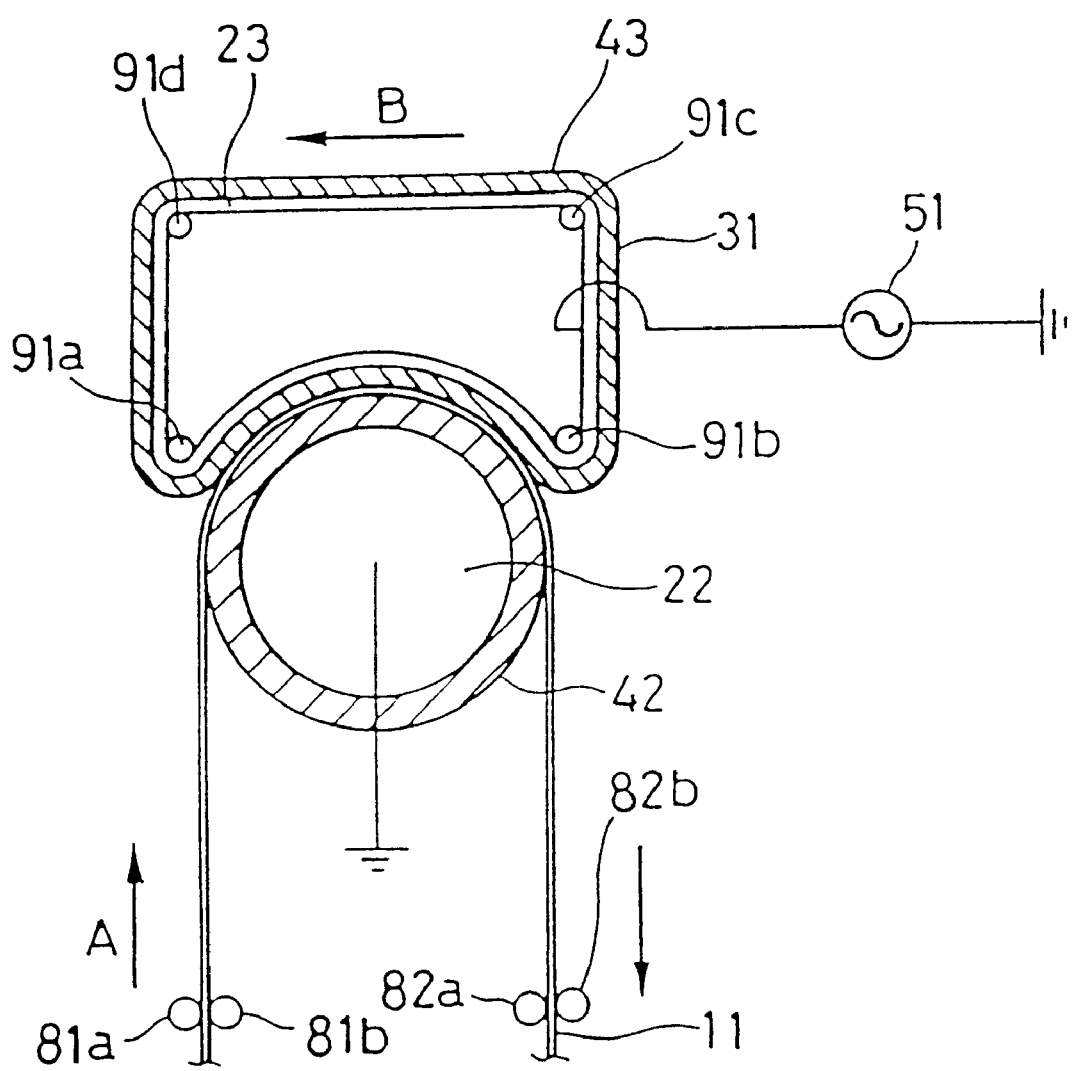
FIG. 4 is a sectional view schematically illustrating still another embodiment of the present invention.

The AC power obtained varies with the shape of the electrodes, the materials of the dielectric layers or porous non-conductor, or the thickness thereof, and thus there is no particular limit thereon. Nevertheless, the AC power is preferably 0.5 to 5 $W/cm^2$, when the porous non-conductor is areally sandwiched between a pair of the electrodes, that is, the areas of the porous non-conductor are sandwiched therebetween, as shown in FIGS. 1 and 4.

Figure 2:
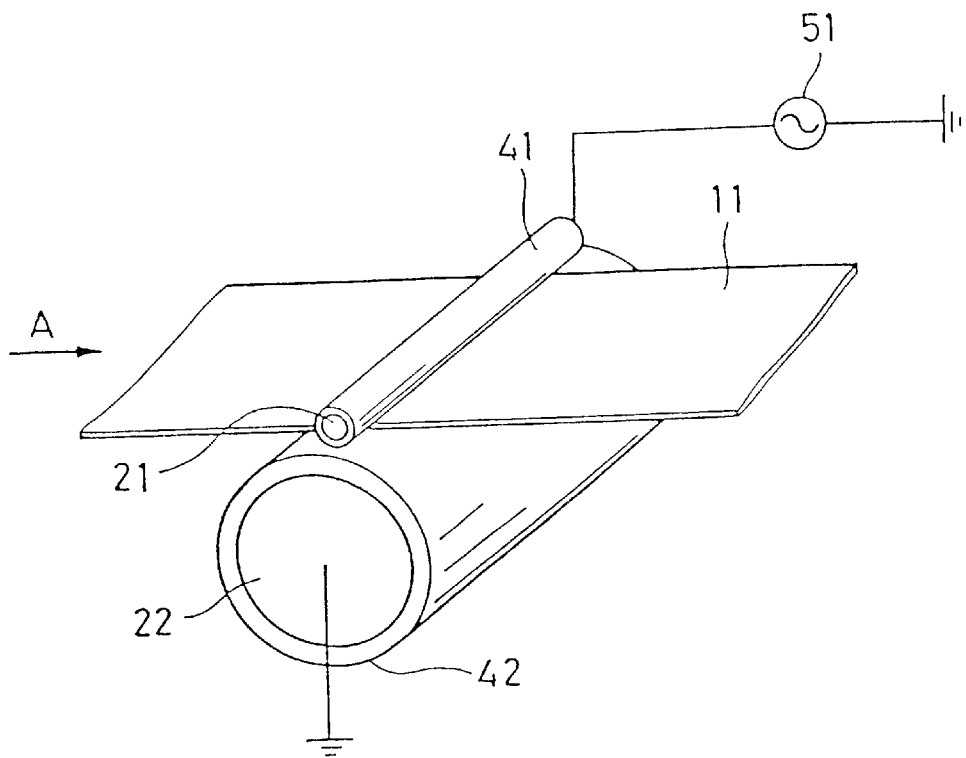
FIG. 2 is a perspective view schematically illustrating an embodiment of the present invention.
Figure 3:
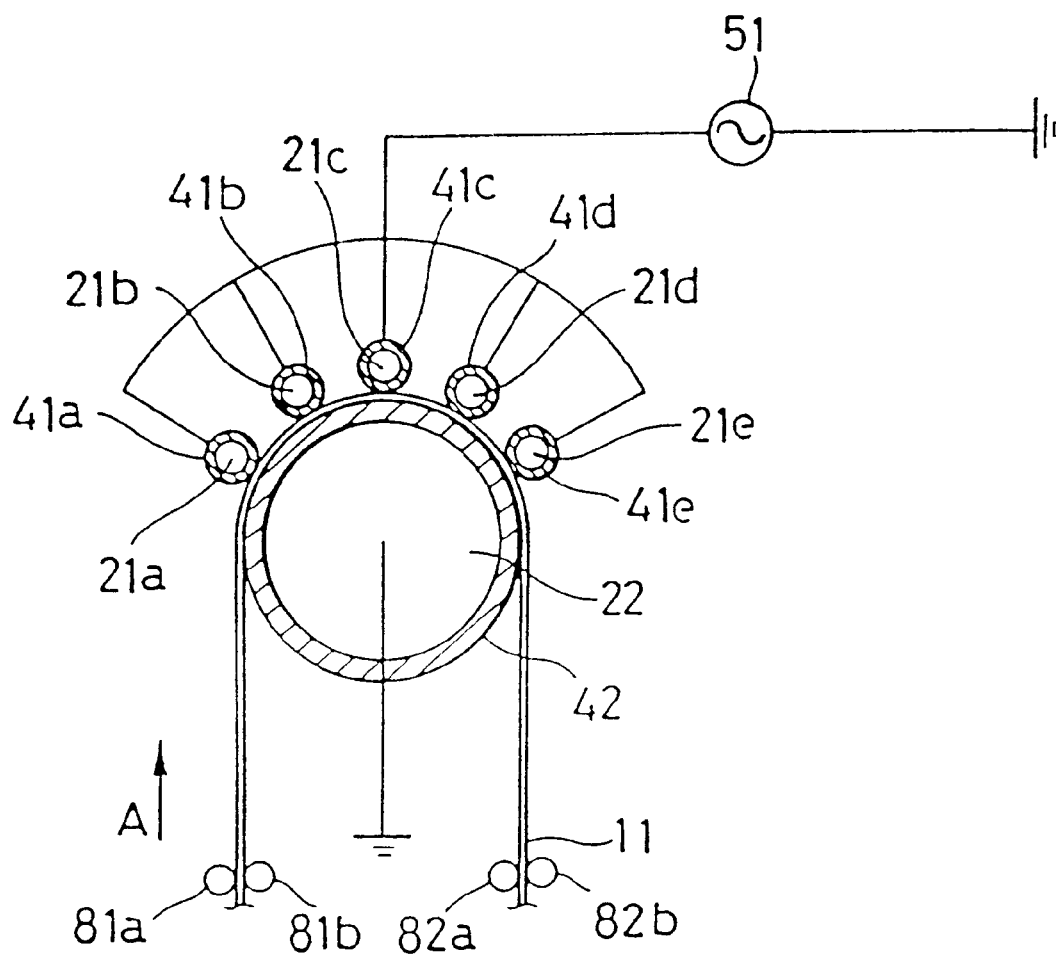
FIG. 3 is a sectional view schematically illustrating another embodiment of the present invention.
Figure 5:
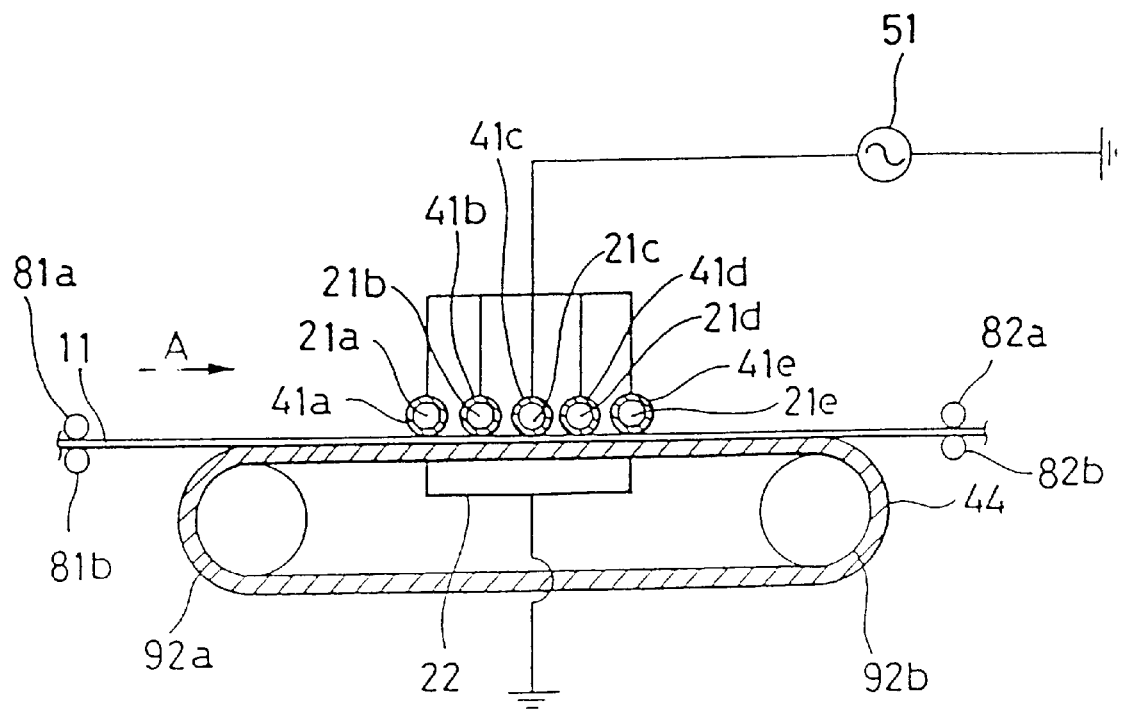
FIG. 5 is a sectional view schematically illustrating still another embodiment of the present invention.
Figure 6:
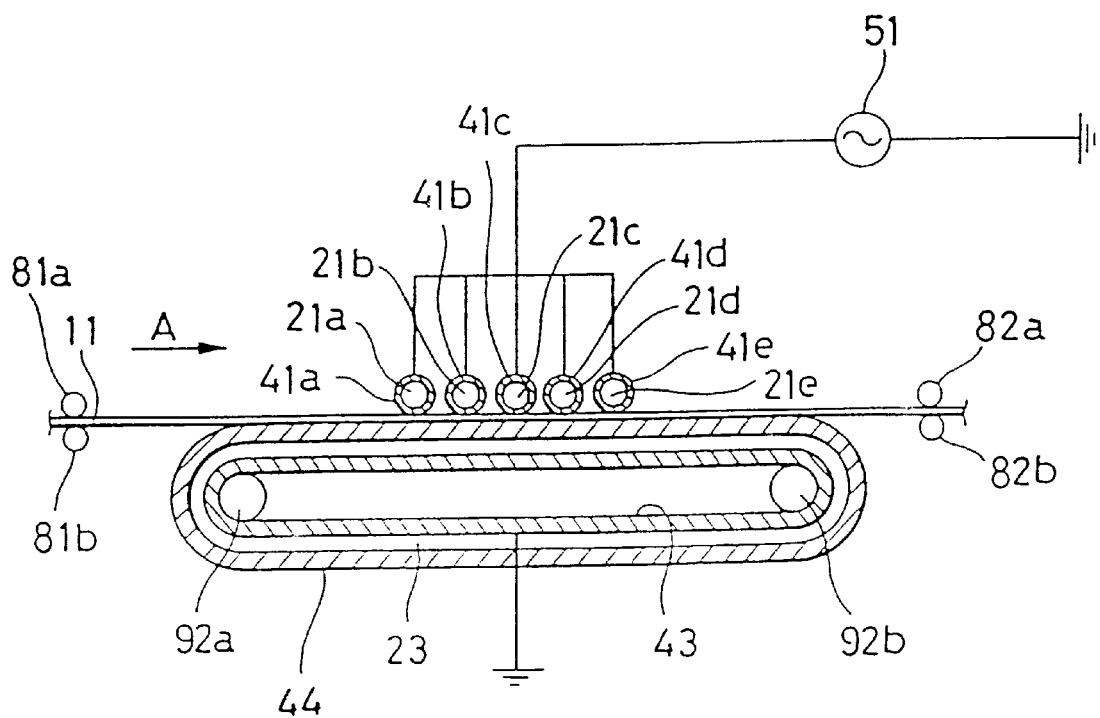
FIG. 6 is a sectional view schematically illustrating still another embodiment of the present invention.

When the porous non-conductor is linearly sandwiched between a pair of the electrodes, as shown in FIGS. 2, 3, 5 and 6, the AC power is preferably 0.1 to 9 W/cm, more preferably 0.1 to 6 W/cm. Note, when the porous non-conductor is linearly sandwiched using a plurality of electrodes as shown in FIGS. 3, 5 and 6, the figures as set forth for the AC power mean a power per electrode.

If the AC power is less than the above-mentioned scope, i.e., less than 0.5 $W/cm^2$ when the porous non-conductor is areally sandwiched, or less than 0.1 W/cm when the porous non-conductor is linearly sandwiched, a discharge may mainly occur only at portions where the discharge is easily induced, and thus the outer-inner surfaces may not be uniformly treated. If the AC power is more than the above-mentioned scope, i.e., more than 5 $W/cm^2$ when the porous non-conductor is areally sandwiched, or more than 9 W/cm when the porous non-conductor is linearly sandwiched, pores may be formed in the porous non-conductor by an arc discharge.

The wave form of the voltage applied is not particularly limited, and may be, for example, a sine wave, a triangle wave, or a rectangle wave. A pulse wave as shown in FIG. 10 is preferable, because it can even prevent a generation of heat or a spark discharge.

Figure 10:
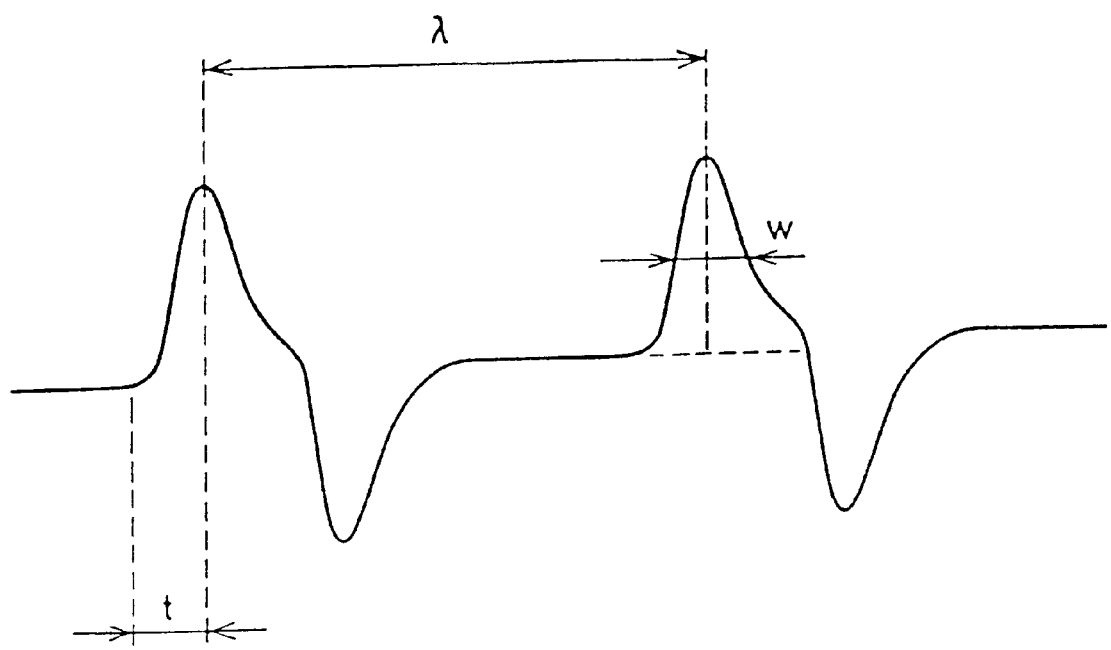
FIG. 10 illustrates a shape of a pulse wave which may be used in the present invention.

In the pulse wave, the pulse rise time t as shown in FIG. 10 is preferably 1 microsecond or less, more preferably 0.5 microsecond or less. The voltage pulse width, or half width w as shown in FIG. 10, is preferably 10 microseconds or less, more preferably 2 microseconds or less. Although preferable range of the frequency of the pulse wave, for example, the frequency when the wave length λ as shown in FIG. 10 is one cycle, is not particularly limited, the upper limit is preferably 100 KHz, more preferably 50 KHz, and the lower limit is preferably 0.1 KHz, more preferably 0.5 KHz, most preferably 1 KHz, for the reasons stated above.

When the pulse wave as above is used, the outer-inner surfaces of the porous non-conductor, such as a melt-blown non-woven fabric, which is easily damaged by holes formed by a spark discharge can be treated without the forming of such holes.

The numerical values as mentioned as above for the AC applied to generate the discharge vary considerably in accordance with the shape of the electrodes, the materials of the porous non-conductor, the wave shape of the discharge voltage, or the treatment time, and thus an AC outside the above scope may be used.

FIG. 1 illustrates an embodiment wherein the electrode 21 is connected to the AC supply 51, and the electrode 22 is grounded. In the present invention, however, the electrode 22 may be connected to the AC supply 51, and the electrode 21 may be grounded.

The material of the electrodes able to be used in the present invention may be an electrically conductive material having a specific electric resistance of preferably $10^3$ Ω·cm or less, more preferably $10^0$ Ω·cm or less, for example, a metal, such as stainless steel, aluminum or tungsten, or an electrically conductive metal oxide, carbon, or an electrically conductive composite rubber of an electrical conductor (such as powdered metal or powdered carbon) and rubber.

The shape of the electrodes may be, for example, a sheet, plate or cylinder. When the porous non-conductor is moved relative to the electrodes as shown in FIGS. 2 to 6, a cylindrical electrode which is rotatable synchronously with the parallel movement of the porous non-conductor around the central axis of the electrode is preferable, whereby little damage to the surface of the porous non-conductor occurs.

In the present invention, the lower limit of the pressure applied to the electrodes is the pressure needed to ensure an area contact of the electrodes and the dielectric layers, and the dielectric layers and the porous non-conductor, without a formation of substantial spaces therebetween. The upper limit of the pressure applied to the electrodes is a pressure such that damage to the shape of the porous non-conductor to be treated will not occur.

The dielectric layer which may be used in the present invention may be non-porous as a whole, or may contain a porous portion. If a dielectric layer used is porous as a whole, a spark discharge may occur in the porous voids of the porous non-conductor and the dielectric layer. Therefore, the use of such a dielectric layer in the present invention is not preferable. Further, it is not preferable to use a dielectric layer containing a porous portion through in the direction of the thickness, for the same reason.

When the dielectric layer used contains a porous portion on the surface which is to be in contact with the porous non-conductor to be treated, the contacting portions of the dielectric layer and the porous non-conductor are reduced in comparison with the case where the dielectric layer used is non-porous as a whole, and thus the outer surfaces of the porous non-conductor can be more effectively treated.

Dielectric materials which may be used for the dielectric layer in the present invention may be, for example, glass, ceramic (such as alumina), rubber (such as synthetic rubber, such as silicone rubber, chloroprene rubber, butadiene rubber, or natural rubber), or thermoplastic resin (such as polytetrafluoroethylene, or polyester). It is preferable to use the dielectric layer containing rubber or a thermoplastic resin material having a high elasticity, in the portion, particularly the surface, which is to come into contact with the porous non-conductor. It is more preferable to use the dielectric layer containing rubber having a high elasticity and close contact properties. Further, it is preferable to use rubber which will cause very little damage to the surface of the porous non-conductor to be treated, or polytetrafluoroethylene which is resistant to dielectric breakdown.

The thickness of the dielectric layer is not particularly limited but is preferably about 0.05 to 5 mm. If the thickness is more than 5 mm, the voltage applied may become too high and a discharge will occur. If the thickness is less than 0.05 mm, the mechanical strength of the dielectric layer may be lowered, and a dielectric breakdown may easily occur.

The porous non-conductor, i.e., the electrically-non-conductive porous article, which may be treated at the outer-inner surfaces thereof according to the present invention, may be any organic or inorganic porous non-conductor. The organic material may be any organic polymer material, for example, polyolefin, such as polyethylene or polypropylene, polyester, polycarbonate, polyvinyl chloride, fluorinated ethylene propylene copolymer (FEP), polyvinylidene fluoride (PVDF), vinylidene fluoride-trifluoroethylene copolymer.

The inorganic material may be any ceramic, such as alumina, silica or silica alumina, or any glasses, such as soda glass or silica glass.

The porous article made of this material may be, for example, a fibrous porous article, film porous article, or foamed porous article. The fibrous porous article may be, for example, woven fabric, knitted fabric, fibrous porous film, or non-woven fabric. The non-woven fabric may be, for example, drylaid non-woven fabric, such as hydro-entangled, needle-punched, binder-bonded, or fusion-bonded non-woven fabric, spun-bonded non-woven fabric, melt-blown non-woven fabric, or wetlaid non-woven fabric. The foamed porous article may be, for example, open-cell foam or closed-cell foam made of polyolefin, polyester or polyurethane resin. The film porous article may be, for example, a film having a concave structure, or a film having holes.

The present invention may be applied particularly to the treatment of the fibrous porous article made of an electrically-non-conductive organic material, for example, a non-woven fabric sheet, particularly a non-woven fabric sheet which may be used as a separator for an alkaline battery. The non-woven fabric which may be used as the separator for the alkaline battery is not particularly limited, but may be, for example, a non-woven fabric which contains at least polyolefin fibers, i.e., polyethylene, ethylene-based copolymer, polypropylene, propylene-based copolymer, polybutene, butene-based copolymer, polymethylpentene, or pentene-based copolymer, as a resin component, and prepared, for example, by hydro-entangling, fusion-bonding, or melt-blowing or a combination thereof.

The shape of the porous non-conductor which can be treated at the outer-inner surfaces according to the present invention is not particularly limited, as long as the non-conductive article contains voids therein when the outer surface is brought into contact with the dielectric layers.

The void ratio of the porous non-conductor which can be treated at the outer-inner surfaces according to the present invention is more than 0% and less than 99%. The void ratio means the ratio when treated. Particularly, an inner-surface of a porous non-conductor wherein the void ratio is 95% or more cannot be treated by the conventional process using glow discharge, but can be treated according to the present invention.

The pore size of the inner void is not particularly limited but is preferably 1 mm or less in average. Particularly, an inner-surface of a porous non-conductor wherein the average pore size of the voids is 0.1 mm or less, particularly 30 μm or less cannot be treated by the conventional process using glow discharge, but can be treated according to the present invention. The average pore size of the fibrous porous article can be measured by, for example, COULTER POROMETER II (Coulter). If the average pore size is more than 1 mm, an arc discharge may occur and damage the porous article to be treated. A porous article containing voids having an average pore size of more than 1 mm can be treated, if the average pore size can be reduced to 1 mm or less when subjected to pressure during the treatment. When the average pore size is 0.1 mm or less, little sparking occurs. There is no particular lower limit of the inner size of the voids, as long as a discharge can be generated in the voids.

The thickness of the porous non-conductor when sandwiched between the dielectric layers is not particularly limited, because the preferable thickness varies in accordance with the thickness of the dielectric layers or kinds of the porous non-conductor per se. Nevertheless, the thickness is preferably 10 mm or less, more preferably 1 mm or less. If the thickness is more than 10 mm, an arc discharge easily occurs, and a high voltage is required to generate a discharge. When the thickness is 1 mm or less, little sparking occurs, and an article made of materials which are not resistant to heat can be treated. The porous article having a thickness of more than 10 mm can be also treated, if the thickness can be reduced to 10 mm or less when subjected to pressure during the treatment. Further, the inner-surface of the porous article having a thickness of 0.1 mm or more cannot be treated by the conventional process using a glow discharge, but can be treated according to the present invention.

The permeability of the porous non-conductor is not particularly limited in the present invention. An inner-surface of a porous article having a permeability of, for example, 0.5 to 200 ml/cm$^2$·s, particularly 1 to 150 ml/cm$^2$·s, cannot be treated by the conventional process using a glow discharge, but can be treated according to the present invention.

The conventional process using a glow discharge cannot treat the inner surfaces of the porous non-conductor having a void ratio of 95% or less, an average void-pore size of 0.1 mm or less, a thickness (including the thickness when under pressure) of 0.1 to 10 mm, or a permeability of 0.5 to 200 ml/cm$^2$·s. On the contrary, the outer-inner surfaces of such a porous non-conductor, particularly the porous non-conductor having a void ratio of 95% or less, an average void-pore size of 0.1 mm or less, a thickness (including the thickness when under pressure) of 0.1 to 10 mm, and a permeability of 0.5 to 200 ml/cm$^2$·s can be treated according to the present invention.

The present invention can be carried out in an open system, namely, under an atmospheric pressure and generally in the presence of air. It is not necessary to carry out the present invention in a closed or sealed system, for example, a sealed vessel. Nevertheless, a discharge can be generated, while a surface-treating gas other air is supplied into the inner voids of the porous non-conductor. The conventional process using a glow discharge requires an inert gas, such as a rare gas, to generate a stable discharge, whereas the present invention does not require such a gas. In the present invention, the surface-treating gas can be supplied into the inner voids of the porous non-conductor by, for example, forcibly inserting the gas into the voids, spraying the gas directly against or around the article, or providing a gas atmosphere around the article. The supplement of the gas as above may be carried out in an open or closed system.

When a high AC voltage is applied to generate a discharge while the surface-treating gas is supplied into the voids of the porous non-conductor by, for example, a gas-supplying pipe or the like, the surface-treating gas is reacted with the inner surfaces of the porous non-conductor by the action of the plasma generated in the inner voids of the porous non-conductor, whereby the inner surfaces of the porous non-conductor can be modified, for example, a desired functional group can be introduced into the inner surfaces.

When a surface-treating gas other than air is supplied into the inner voids of the porous non-conductor, it is preferable to fill the porous non-conductor and the surroundings thereof with the particular gas, to thereby prevent the porous non-conductor from contact with air and prevent the occurance of undesirable reactions. When a gas atmosphere is provided around the porous non-conductor, it is possible to place the porous non-conductor, the electrodes and the dielectric layers in a sealed vessel, charge the surface-treating gas into the vessel, and carry out the discharge process. This embodiment is preferable, because the portions to be treated can be filled with the particular gas, and thus contact with air can be prevented.

The surface-treating gas which may be used in the present invention is not particularly limited, and it can be appropriately selected from among known gases in accordance with the desired surface treatment. For example, air or oxygen gas can be used when the surface treatment is carried out to impart hydrophilic properties to the porous non-conductor or enhance the hydrophilic properties of the porous non-conductor. Further, tetrafluoromethane ($CF_4$) can be used, when the surface treatment is carried out to impart hydrophobic properties to the porous non-conductor or enhance the hydrophobic properties of the porous non-conductor.

The concentration of the surface-treating gas is not particularly limited, and can be appropriately selected in accordance with the desired surface treatment. The outer-inner surfaces of the porous non-conductor can be treated while the kind and/or concentration of the surface treatment is constantly maintained or gradually changed with time.

When the outer-inner surfaces of the porous non-conductor are physically treated, for example, roughened, it is preferable to apply a higher AC voltage than when only the chemical treatment is carried out while supplying the surface-treating gas, and to prolong the discharge time. When the roughening treatment of the porous non-conductor is carried out while the water-repellancy thereof is maintained, it is preferable to perform the treatment while a gas, such as tetrafluoromethane, capable of imparting a water-repellancy, is supplied.

In the present invention, the outer-inner surfaces of the porous non-conductor are treated only at the portions sandwiched between a pair of the electrodes. Therefore, the portions to be treated can be adjusted to any shape by adjusting the shape of at least one of the electrodes. For example, when using a pair of a plane electrode and an electrode having a desired shape, such as a net-structure electrode or one or more linear electrodes, the porous non-conductor can be treated selectively to produce the net-structure or the linear pattern.

A sufficient amount of the gaseous active chemical species which must be used in the conventional process using the glow discharge cannot reach into voids existing in portions deeper than the surface layer of the porous non-conductor. Therefore, the inner surfaces of the porous non-conductor cannot be treated to the same extent as the outer surfaces of the porous non-conductor, in the conventional process using the glow discharge. In the modified porous article by the conventional process, the degree of surface treatment is sharply lowered from the outer surfaces to the inner surfaces, and very little modification of the inner surfaces is obtained.

To the contrary, in the present invention, the discharge is generated in the inner voids, the surfaces are treated with the generated discharge, and therefore the outer-inner surfaces are uniformly treated. Note, however, that the treatment degree of the exposed surfaces is sometimes lower in comparison with that of the surfaces other than the exposed surfaces, i.e., the unexposed surfaces. This is because a part of the exposed surfaces is brought into contact with the dielectric layers when the discharge is generated in the inner voids, and theoretically, the plasma generated in the inner voids cannot act thereon. The part in contact with the dielectric layer is mainly treated only by the plasma remaining in the vicinity of the contacting part, or radicals produced by the remaining plasma, when the porous non-conductor is separated from the dielectric layers.

The modified porous non-conductor of the present invention may be prepared by, for example, chemically treating at least a part of the outer-inner surfaces of the porous non-conductor to thereby introduce one or more functional groups capable of imparting or enhancing the desired properties onto the surfaces to be treated.

The porous non-conductor which may be modified can be found among those which can be treated at the outer-inner surfaces according to the present invention as mentioned above. Particularly, the inner surface of the porous non-conductor which cannot be treated by the conventional process using a glow discharge, for example, a porous non-conductor having a void ratio of 95% or less, an average void-pore size of 0.1 mm or less, a thickness (including the thickness when under pressure) of 0.1 to 10 mm, or a permeability of 0.5 to 200 ml/cm$^2$·s, particularly, a porous non-conductor having a void ratio of 95% or less, an average void-pore size of 0.1 mm or less, a thickness (including the thickness when under pressure) of 0.1 to 10 mm, and a permeability of 0.5 to 200 ml/cm$^2$·s can be treated to produce the modified article accordance to the present invention.

In the modified porous non-conductor according to the present invention, an introducing efficiency rate (A/B) of a functional group-introducing efficiency (A) at an exposed surface to which a functional group is introduced, to a functional group-introducing efficiency (B) at an unexposed surface to which a functional group is introduced is less than 1 (i.e., A/B<1), preferably 0.3 to 0.95 (0.3≦A/B≦0.95), more preferably 0.4 to 0.85 (0.4≦A/B≦0.85). It is possible to bring the introducing efficiency rate (A/B) close to 1 when the dielectric layer used contains a porous dielectric portion at least on a surface facing the other dielectric layer. In this case, the ratio of the contacting surfaces of the outer surface of the porous non-conductor and the dielectric layer, i.e., the ratio of the surfaces upon which the plasma generated by the discharge theoretically does not act, is reduced, in comparison with the case wherein the non-porous dielectric layer is used.

When the surfaces of the porous non-conductor are treated by the conventional process using the glow discharge, the unexposed surfaces are not properly treated, and therefore, the introducing efficiency rate (A/B) is more than 1.

The functional group-introducing efficiency on the treated surface, i.e., the surface to which a functional group is introduced, is not particularly limited, as long as it is an index which can be expressed as a value which enables an objective comparison of the degrees of the functional groups introduced to the surfaces. The degrees of the functional groups introduced can be compared by appropriately selecting an atomic group or atom in accordance with the functional group introduced.

For example, when the porous non-conductor to be treated is made of organic materials, a ratio of the numbers of the introduced functional groups to the number of carbon atoms on the surface to which the functional groups are introduced, or a ratio of the numbers of particular atoms contained in the introduced functional groups to the number of carbon atoms on the surface to which the functional groups are introduced, is used as the functional group-introducing efficiency.

When the latter ratio of the number of particular atoms contained in the introduced functional groups to the number of carbon atoms on the surface to which the functional groups are introduced is used as the functional group-introducing efficiency, the functional group-introducing efficiency on the surface to be compared can be determined, for example, by measuring a peak area of carbon atoms on the surface to be compared, and a peak area of particular atoms contained in the introduced functional groups on the surface to be compared, by X-ray photoelectric spectrophotometry, and making a correction of a photo-ionization cross section. The introducing efficiency on the exposed surface can be determined by measuring the surface of the modified article by X-ray photoelectric spectrophotometry. The introducing efficiency on the unexposed surface can be determined by exposing the unexposed surface, for example, taking out a part (such as fibers) of the inside of the modified article, or preparing a slice sample of the modified article, and then conducting an X-ray photoelectric spectrophotometry.

For example, when the porous non-conductor is treated according to the present invention in air, to thereby impart or enhance the hydrophilic properties thereof, a modified article containing oxygen atoms introduced to the treated surfaces is obtained. In this case, the introducing efficiency, i.e., the ratio of the numbers of oxygen atoms to the number of carbon atoms, in each of the exposed or unexposed surfaces can be determined, for example, by measuring a peak area of each of carbon and oxygen atoms on each of the exposed and unexposed surfaces by the X-ray photoelectric spectrophotometry, and then making a correction of photo-ionization cross section. Thereafter, the introducing efficiency rate can be determined.

The modified article according to the present invention can be identified by detecting the modification (i.e., treatment), and detecting the difference between the properties of the exposed and unexposed surfaces. For example, the modification and the differences of the properties can be detected by a wetting index as follows:

(1) A part of a certain porous sample is analyzed by infrared spectroscopy to determine a constitutional material of the random portion. The portion not belonging to the outer-inner surfaces may be, for example, a solid portion in the film porous article or a foamed porous article, or an inner portion of a constitutional fiber. A wetting index is determined from a wetting test of polyethylene and polypropylene film (JIS K 6768$^{-1977}$). When the sample is made of a plurality of materials, a wetting index of the material having a lower index is used. Further, an indicating agent capable of wetting and coloring the material having the determined index is selected.

(2) The sample is dipped in a solution of the selected indicating agent containing a coloring agent, and taken out therefrom. The surface of the sample belongs to one of the following cases (a) to (c):

(a) The surface contains a colored portion (untreated portion) and a non-colored portion. The non-colored portion means that a hydrophobic treatment has been conducted. In this case, the sample is further analyzed in the step (4) as below.

(b) The sample is not colored at all. This result means that a hydrophobic treatment has been conducted to the whole sample. In this case, the sample is further analyzed in the step (4) as below.

(c) The whole sample is colored. This result means that a hydrophilic treatment has been conducted to the whole sample or a part thereof, or no treatment has been conducted to the whole sample. In this case, the sample is further analyzed in the step (3) as below.

(3) The sample is dipped in a solution of an indicating agent having a wetting index higher than that of the indicating agent used in the above step (2), and then taken out therefrom. It is preferable to use an indicating agent having a wetting index slightly higher than that of the indicating agent used in the above step (2), and then repeating the above procedure, successively using indicating agents having gradually increasing wetting indexes. The surface of the sample belongs to one of the following cases (d) to (f):

(d) The whole sample is not colored, when the indicating agent having a wetting index slightly higher than that of the indicating agent used in the above step (2) is used. This result means that no treatment has been conducted to the whole sample.

(e) The surface contains a non-colored portion (untreated portion) and a colored portion, when the indicating agent having a wetting index slightly higher than that of the indicating agent used in the above step (2) is used. This result means that a hydrophilic treatment has been conducted to the colored portion. In this case, the sample is further analyzed in the step (4) as below.

(f) When the indicating agents having gradually increasing wetting indexes are used, the whole sample is colored with all indicating agents having up to a certain level of wetting indexes, but the whole sample is not colored with an indicating agent having a wetting index slightly higher than the above-mentioned level. This result means that a hydrophilic treatment has been conducted to the whole sample. In this case, the sample is further analyzed in the step (4) as below.

The above steps (1) to (3) can reveal whether or not a modification or treatment has been conducted. When a modification is detected, the differences of the properties on the exposed and unexposed surfaces will be detected as follows:

(4) A ratio of the numbers of the introduced functional groups to the numbers of carbon atoms on each of the exposed or unexposed surfaces to which the functional groups are introduced, is measured by, for example, X-ray photoelectric spectrophotometry. When the surface treatment is a hydrophilic treatment, i.e., the cases (e) or (f), a particular atom, such as an oxygen atom, is selected as the functional group. When the surface treatment is a hydrophobic treatment, i.e., the cases (a) or (b), a particular atom, such as a fluorine atom, is selected as the functional group. If the introducing efficiency rate (A/B), i.e., the ratio (A) of the exposed surface to the ratio (B) of the unexposed surface is less than 1, the sample can be identified as the modified article according to the present invention.

The present invention is not limited to the embodiment as shown in FIG. 1, wherein the porous non-conductor is treated under a static condition to generate the discharge. According to the present invention, the porous non-conductor can be continuously treated while the porous non-conductor is moved. This embodiment is shown in FIG. 2.

In this embodiment, cylindrical electrodes 21, 22 are located opposite to each other, and the surfaces of the cylindrical electrodes 21, 22 are covered with dielectric layers 41, 42, respectively. The cylindrical electrodes 21, 22 may be rotatable around their axes, respectively, or nonrotatably fixed. The preferable cylindrical electrode is rotatable around its axis, as this produces very little damage to the surface of the porous non-conductor.

The electrode 21 is connected to the AC supply 51, and the electrode 22 is grounded. The porous non-conductor 11 is continuously supplied at a predetermined rate in the direction of the arrow A between the dielectric layers 41, 42 which are carried on the surfaces of the electrodes 21, 22, by a conveying means, such as a pair of delivery rolls (not shown), disposed upstream of the electrodes 21, 22. The porous non-conductor 11 is passed through the dielectric layers 41, 42 while brought into contact therewith. Thereafter, the porous non-conductor 11 is continuously conveyed at a predetermined rate by a conveying means, such as a pair of delivery rolls (not shown), disposed downstream of the electrodes 21, 22. A driving means, such as a motor, to supplement a driving force needed to convey the porous non-conductor 11 may be connected with the above-mentioned delivery roll and/or the rotatable electrode.

The rate of supplying and conveying the porous non-conductor 11 is not particularly limited, but may be constant, or periodically or irregularly changed. The rate of supplying and conveying the porous non-conductor 11 is preferably a constant rate such that the surface treatment time of the porous non-conductor is 0.1 second or more. If the rate of supplying and conveying the porous non-conductor 11 is higher, the treatment of the outer-inner surfaces may be insufficient.

When the porous non-conductor 11 is passed through the dielectric layers 41, 42, while brought into contact therewith, a high AC voltage is applied from the AC supply 51, whereby a discharge is generated in the inner voids of the porous non-conductor 11 sandwiched between the contacting portions of the dielectric layers 41, 42, and the plasma is produced. The inner surfaces of the porous non-conductor 11 are modified by the action of the plasma produced in the voids thereof. The plasma produced in the voids in the porous non-conductor 11 does not act on the contacting portions of the dielectric layers 41, 42 and the porous non-conductor 11. Nevertheless, the porous non-conductor 11 is continuously conveyed at a predetermined rate, and therefore, the outer surfaces which have been the contacting portions are successively separated from the dielectric layers 41, 42, and immediately after the separation, the outer surfaces of the porous non-conductor 11 are modified with the plasma produced in the voids near the outer surfaces.

The porous non-conductor 11 is continuously conveyed at a predetermined rate. Therefore, the untreated article 11 is continuously supplied between the dielectric layers 41, 42, and at the same time, the treated article 11 is continuously provided from the dielectric layers 41, 42, whereby the outer-inner surfaces of the porous non-conductor 11 may be continuously treated.

The AC voltage applied from the AC supply to generate the discharge in the embodiment as shown in FIG. 2 is not particularly limited, but the voltage and the frequency are preferably within the same scope as mentioned for the embodiment as shown in FIG. 1, for the same reason as mentioned for the embodiment as shown in FIG. 1. In the embodiment as shown in FIG. 2, the electrode 21 is connected with the AC supply 51, and the electrode 22 is grounded, but the electrode 22 may be connected with the AC supply 51, and the electrode 21 may be grounded.

The embodiment as shown in FIG. 2 of the present invention can be carried out in an open system, namely, under an atmospheric pressure and generally in the presence of air. When a treating gas other than air is necessary in accordance with the desired treatment of the outer-inner surfaces, the discharge can be generated while supplying such a treating gas to the portions to be treated.

In the embodiment as shown in FIG. 2, one cylindrical electrode 21 covered with the dielectric layer 41 is disposed. The number of electrodes 21 is not particularly limited, and one or more electrodes 21 may be disposed. It is preferable to dispose a plurality of electrodes covered with the dielectric layer so that any portion of the outer surfaces of the porous non-conductor can be brought into contact with the dielectric layers on the electrodes a plurality of times, whereby the treatment effect and rate may be increased.

FIG. 3 illustrates still another embodiment of the present invention, wherein five cylindrical electrodes having small diameters and carrying the dielectric layers thereon, respectively, are parallelly disposed at predetermined intervals on the dielectric layer carried on the cylindrical electrode having a large diameter. More particularly, five cylindrical electrodes 21 (sometimes referred to as 21a, 21b, 21c, 21d, and 21e from the upstream of the direction in which the porous non-conductor is conveyed) are parallelly disposed at predetermined intervals on the dielectric layer 42 carried on the cylindrical electrode 22 having a diameter larger than those of the five cylindrical electrodes 21a to 21e, so that the five electrodes 21a to 21e are located opposite to the larger cylindrical electrode 22, respectively. The five electrodes 21a to 21e are covered with the dielectric layers 41a to 41e, respectively (sometimes collectively referred to as the dielectric layer 41).

The cylindrical electrodes 21, 22 may be rotatable around their axes, respectively, or nonrotatably fixed. The preferable cylindrical electrode is rotatable around its axis, because this causes very little damage to the surface of the porous non-conductor, when the porous non-conductor 11 is moved relative to the electrodes 21, 22.

The five electrodes 21a to 21e are connected to a common AC supply 51, and the electrode 22 is grounded. When the electrodes 21a to 21e are connected to the same AC supply, one of the five electrodes 21a to 21e may be disposed such that it is in contact with the adjacent electrode or electrodes. In the embodiment as shown in FIG. 3, the five electrodes 21a to 21e are connected to a common AC supply 51, and a same AC voltage is applied to each of the five electrodes 21a to 21e. Nevertheless, each of the electrodes may be connected to different AC supplies, respectively, and a different voltage may be applied to each of the electrodes, respectively. Note, when the electrodes are connected to different AC supplies, the electrodes must be disposed separately such that they do not come into contact with each other.

The porous non-conductor 11 is continuously supplied at a predetermined rate in the direction of the arrow A between the dielectric layers 41, 42 carried on the surfaces of the electrodes 21, 22, respectively, by a conveying means, such as a pair of delivery rolls 81a, 81b, disposed upstream of the electrodes 21, 22. The porous non-conductor 11 is passed through the dielectric layers 41, 42 while one surface of the porous non-conductor 11 is brought into contact with the dielectric layer 42 carried on the electrode 22, and the other surface opposite to that surface is successively brought into contact with the dielectric layers 41a, 41b, 41c, 41d, 41e. Thereafter, the porous non-conductor 11 is continuously conveyed at a predetermined rate by a conveying means, such as a pair of delivery rolls 82a, 82b, disposed downstream of the electrodes 21, 22. A driving means, such as a motor, needed to supplement a driving force for conveying the porous non-conductor 11 may be connected with the above-mentioned delivery roll and/or the rotatable electrode.

The rate of supplying and conveying the porous non-conductor 11 is not particularly limited, but may be constant, or periodically or irregularly changed. In the embodiment as shown in FIG. 3, the rate is preferably a constant rate such that the surface treatment time of the porous non-conductor is 0.1 second or more. If the rate is higher, the treatment of the outer-inner surfaces may be insufficient.

In the embodiment as shown in FIG. 3, a high AC voltage is applied from the AC supply 51, when the porous non-conductor 11 is passed through the dielectric layers 41, 42 while being brought into contact therewith, whereby the discharge is generated in the inner voids of the porous non-conductor 11 sandwiched between the contacting portions of the dielectric layers 41, 42, and the plasma is produced. As mentioned for the embodiment shown in FIG. 2, the inner surfaces of the porous non-conductor 11 are modified by the action of the plasma produced in the voids thereof.

In the embodiment as shown in FIG. 3, five electrodes 21a to 21e are disposed such that any portion of the outer surfaces of the porous non-conductor can be brought into contact with the dielectric layers on the electrodes plural times. The five electrodes 21a to 21e are covered with the dielectric layers 41a to 41e, respectively. Therefore, the porous non-conductor 11 which has been modified at the outer-inner surfaces between the dielectric layer 41a carried on the electrode 21a and the dielectric layer 42 is conveyed in the direction of the arrow A, to the portion between the dielectric layer 41b carried on the electrode 21b and the dielectric layer 42, where the outer-inner surfaces are modified. Thereafter, the porous non-conductor 11 is successively conveyed to the dielectric layers 41c, 41d, and 41e, modified there at the outer-inner surfaces, and then delivered from the dielectric layer 41e and the dielectric layer 42.

The porous non-conductor 11 is continuously conveyed at a predetermined rate. Therefore, the untreated article 11 is continuously supplied between the dielectric layers 41a, 42, and at the same time, the treated article 11 is continuously provided from the dielectric layers 41e, 42, whereby the outer-inner surfaces of the porous non-conductor 11 may be continuously treated.

The embodiment as shown in FIG. 3 of the present invention can be carried out in an open system or closed system, as in the embodiment shown in FIG. 2. When a gas-supply pipe for supplying the surface-treating gas is provided, the number of pipes is not particularly limited, as long as a sufficient gas can be supplied to the portions to be treated. For example, a pipe can be provided for one combination of an electrode and a dielectric layer, or one pipe provided for each of the combinations of a plurality of electrodes and layers, respectively. The outer-inner surfaces can be treated, while the kind and/or concentrations of the surface-treating gases supplied to each of the plurality of pipes are changed. Further, the outer-inner surfaces can be treated, while the kind and/or concentrations of the surface-treating gas supplied to each of the plurality of pipes are changed with time. Namely, it is possible to control the conditions or degrees of the treatment of the outer-inner surfaces by changing the kind and/or concentrations of the surface-treating gases.

FIG. 4 illustrates still another embodiment of the present invention wherein a belt laminate of an electrode layer and a dielectric layer, such as an aluminum-metallized film belt, is used instead of the five combinations of the electrodes 21a to 21e and the dielectric layers 41a to 41e as shown in FIG. 3.

Four fixed rollers 91a, 91b, 91c, 91d are disposed in parallel in their axial directions, in such a way that their axes are located at four corners of a rectangle. The fixed roller 91a is located near to the dielectric layer 42, and the fixed roller 91 b is located downstream of the fixed roller 91a and near to the dielectric layer 42. The other two fixed rollers 91c and 91d are located separately from the dielectric layer 42.

An endless belt aluminum-metallized film 31 prepared by disposing and forming the aluminum layer 23 on one surface of the polyester dielectric layer 43 is mounted on the fixed rollers 91a, 91b, 91c, 91d so that the film 31 is passed outside of the fixed rollers, the aluminum layer 23 becomes the inside layer, namely, the aluminum layer 23 can be in contact with the fixed rollers, and the polyester dielectric layer 43 becomes the outside layer, namely, the polyester dielectric layer 43 in the aluminum-metallized film 31 is opposed to the dielectric layer 42 carried on the cylindrical electrode 22, while the polyester dielectric layer 43 is passed between the fixed roller 91a and roller 91b.

The electrode 22 carrying the dielectric layer 42 thereon is located such that the dielectric layer 42 can be continuously brought into contact with the endless-belt aluminum-metallized film 31 during the entire passage from the fixed roller 91a to the fixed roller 91b. In this embodiment, however, that the endless-belt aluminum-metallized film 31 need not be brought into contact with the dielectric layer 42 over the entire passage from the fixed roller 91a to the fixed roller 91b. The endless-belt aluminum-metallized film 31 may be brought into contact with the dielectric layer 42 in at least a part of the passage from the fixed roller 91a to the fixed roller 91b, by adjusting the distance between the film 31 and the dielectric layer 42.

The electrode 22 is rotatable around its cylindrical axis, and the fixed rollers 91a, 91b, 91c, 91d are rotatable around their cylindrical axes. Therefore, the endless-belt aluminum-metallized film 31 mounted outside the fixed rollers can be moved in one direction (for example, in the direction of the arrow B). The aluminum layer 23 in the aluminum-metallized film 31 is connected to the AC supply 51, and the electrode 22 is grounded. FIG. 4 illustrates the embodiment wherein the aluminum layer 23 is connected to the AC supply 51, and the electrode 22 is grounded, but the electrode 22 may be connected to the AC supply 51, and the aluminum layer 23 may be grounded.

The porous non-conductor 11 is continuously supplied at a predetermined rate in the direction of the arrow A between the fixed roller 91a and the dielectric layer 42 carried on the surface of the electrode 22, by a conveying means, such as a pair of delivery rolls 81a, 81b, disposed upstream of the fixed roller 91a and the electrode 22. The porous non-conductor 11 is passed through the dielectric layer 42 and the fixed roller 91b while one surface of the porous non-conductor 11 is brought into contact with the dielectric layer 42 carried on the electrode 22, and the other surface opposite to that surface is successively brought into contact with the polyester dielectric layer 43. Thereafter, the porous non-conductor 11 is continuously conveyed at a predetermined rate by a conveying means, such as a pair of delivery rolls 82a, 82b, disposed downstream of the fixed roller 91b and the electrode 22. A driving means, such as a motor, needed to supplement a driving force used to convey the porous non-conductor 11 may be connected with the above-mentioned fixed rollers, delivery roll and/or the rotatable electrode.

In the embodiment as shown in FIG. 4, the outer-inner surfaces of the porous non-conductor can be continuously treated as in the embodiment shown in FIG. 3. The discharging area becomes larger in the embodiment as shown in FIG. 4 in comparison with that shown in the embodiment as shown in FIG. 3, whereby the treatment efficiency and treatment rate can be increased.

The embodiment as shown in FIG. 4 can be carried out in an open or closed system.

In addition to the belt aluminum-metallized film, the belt laminate of the electrode and the dielectric layer which may be used in the embodiment as shown in FIG. 4 may be, for example, a laminate of an electrode, such as a metal foil, a metal sheet or an electrically conductive resin sheet containing a conductive material, and a dielectric layer, such as a resin film, a resin sheet or a rubber sheet. A metallized film other than the aluminum-metallized film may be used.

FIG. 5 illustrates a still further embodiment wherein a plane electrode 22 and a dielectric conveyer 44, as a combination of the electrode and the dielectric layer, are used.

The dielectric conveyer 44, which is made of a dielectric material and can convey the porous non-conductor 11 in the direction of the arrow A by means of a pair of the conveyer-driving rollers 92a, 92b which are disposed separately from each other in a predetermined distance, is disposed opposite to five cylindrical electrodes 21 (sometimes referred to as 21a, 21b, 21c, 21d, and 21e from the upstream of the conveying direction of the porous non-conductor 11) which are parallelly located at predetermined intervals along the surface of the dielectric conveyer 44. The five electrodes 21a to 21e are covered with the dielectric layers 41a to 41e (sometimes collectively referred to as the dielectric layer 41).

The cylindrical electrode 21 may be rotatable around its axis, or nonrotatably fixed. The preferable cylindrical electrode is rotatable around its axis, because this causes very little damage to the surface of the porous non-conductor, when the porous non-conductor 11 is moved relative to the electrodes 21. The plane electrode 22 is disposed at the opposite side of the dielectric conveyer 44 with respect to the electrode 21.

The five electrodes 21a to 21e are connected to a common AC supply 51, and the electrode 22 is grounded. In the embodiment as shown in FIG. 5, the five electrodes 21a to 21e are connected to a common AC supply 51, and a same AC voltage is applied to each of the five electrodes 21a to 21e. Nevertheless, each of the electrodes may be connected to different AC supplies, respectively, and a different voltage may be applied to each of the electrodes, respectively. In the embodiment as shown in FIG. 5, the five electrodes 21a to 21e are connected to a common AC supply 51, and the electrode 22 is grounded, but the electrode 22 may be connected to an AC supply 51, and the five electrodes 21a to 21e may be grounded.

The porous non-conductor 11 is transferred on the dielectric conveyer 44 by a conveying means, such as a pair of delivery rolls 81a, 81b, disposed upstream of the electrodes 21, 22, and then continuously supplied at a predetermined rate in the direction of the arrow A between the electrodes 21a, 22, by means of the dielectric conveyer 44. The porous non-conductor 11 is passed through the electrodes 21, 22 while one surface of the porous non-conductor 11 is continuously brought into contact with the dielectric conveyer 44, and at the same time, the other surface opposite to that surface is successively brought into contact with the dielectric layers 41a, 41b, 41c, 41d, 41e. Thereafter, the porous non-conductor 11 is continuously conveyed on the dielectric conveyer 44, and then conveyed at a predetermined rate by a conveying means, such as a pair of delivery rolls 82a, 82b, disposed downstream of the electrodes 21, 22. A driving means, such as a motor, needed to supplement a driving force used to convey the porous non-conductor 11 may be connected with the above-mentioned conveyer-driving rollers, delivery roll and/or the rotatable electrode.

In the embodiment as shown in FIG. 5, the outer-inner surfaces of the porous non-conductor 11 can be continuously treated, as in the embodiment shown in FIG. 3. In this embodiment, the dielectric conveyer is used, and therefore, a conventional plane electrode can be used as an inducing electrode. The embodiment as shown in FIG. 5 can be carried out in an open or closed system, as in the embodiment shown in FIG. 3.

In the embodiment as shown in FIG. 5, a combination of the plane electrode 22 and the dielectric conveyer 44, or a combination of the five electrodes 21a to 21e and the dielectric layers 41a to 41e are used as a combination of the electrode and the dielectric layer. Nevertheless, it is possible in this embodiment to use the belt laminate of the electrode and the dielectric layer as shown in FIG. 4, instead of one or both of those combinations.

FIG. 6 illustrates the embodiment of the present invention wherein a belt laminate of an electrode and a dielectric layer is used instead of the combination of the plane electrode 22 and the dielectric conveyer 44 as shown in FIG. 5. In this embodiment, a three-layered laminate of a dielectric polyester film 44, an aluminum film 23 and a conveyer sheet 43 is used. The three-layered laminate may be prepared by laminating an aluminum-metallized film of the aluminum layer 23 and the polyester dielectric layer 44, and the conveyer sheet 43, so that the polyester dielectric film 44 is brought into contact with the aluminum layer 23 on one surface, and at the same time, in contact with the porous non-conductor 11. In this embodiment, a two-layered laminate composed of the aluminum layer 23 and dielectric layer 44 may be used, but the conveyer sheet 43 can enhance the durability of the aluminum layer 23 as the electrode layer.

Figure 7:
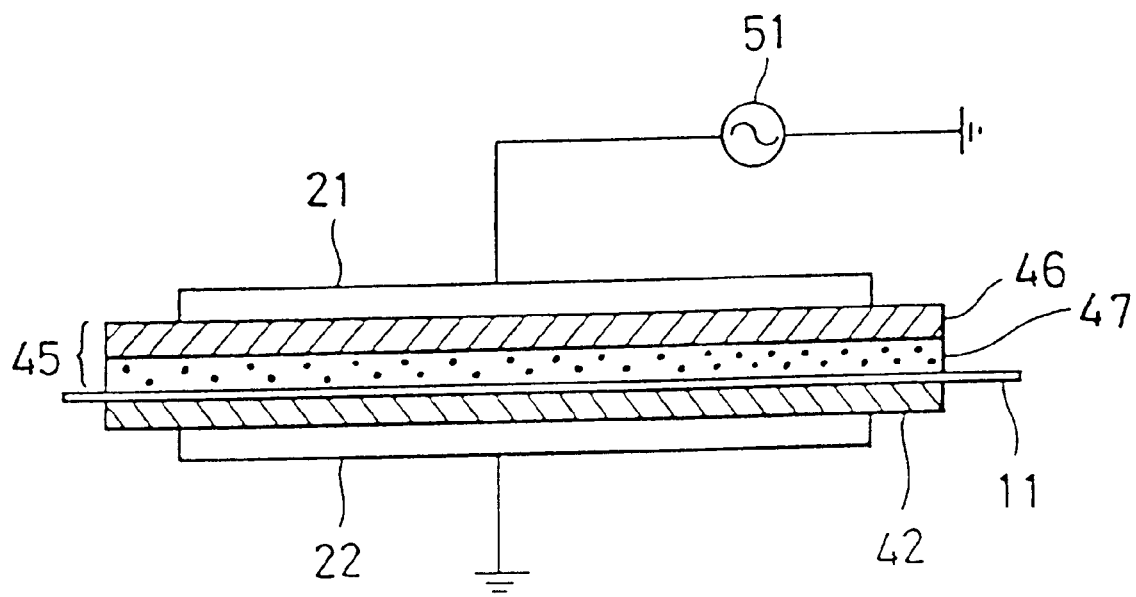
FIG. 7 is a sectional view schematically illustrating still another embodiment of the present invention.

FIG. 7 illustrates the embodiment of the present invention wherein a dielectric layer containing a porous layer disposed on all over the surface facing the porous non-conductor to be treated, that is, a dielectric layer consisting of a porous layer at the side facing the porous non-conductor and a non-porous layer at the side facing the electrode layer, is used.

As shown in FIG. 7, a pair of the electrodes, such as plane electrodes 21, 22, are disposed opposite to each other. The first electrode 21 carries the dielectric layer 45 on the opposite surface. The dielectric layer 45 consists of the non-porous dielectric layer 46 at the side of the electrode 21, and the porous dielectric layer 47 at the side of the opposite surface. The second electrode 22 carries the non-porous dielectric layer 42 on the opposite surface.

The porous non-conductor 11 is placed between the porous dielectric layer 47 and the non-porous dielectric layer 42 in such a way that the porous non-conductor is brought into contact with both the porous dielectric layer 47 and the non-porous dielectric layer 42 without coming into contact with the electrodes 21, 22. The electrodes 21, 22 are placed under a suitable pressure so that no substantial spaces are formed between the porous dielectric layer 47 and the porous non-conductor 11, and the porous non-conductor 11 and non-porous dielectric layer 42, respectively. If the spaces are formed between the dielectric layers and the porous non-conductor, a uniform discharge may not occur, and thus holes may be formed in the porous non-conductor.

One of the electrodes, such as the electrode 21, is connected to the AC supply 51, and the other electrode, such as the electrode 22 is grounded. The electrode 22 may be connected to the AC supply 51, and the electrode 21 may be grounded.

When a high AC voltage is applied from the AC supply 51, a discharge occurs not only in the inner voids of the porous non-conductor 11, but also in the inner voids of the porous dielectric layer 47, to generate a plasma. The plasma formed in the inner voids of the porous non-conductor 11 acts on the inner and outer surfaces of the porous non-conductor 11, and at the same time, the plasma formed in the inner voids of the porous dielectric layer 47 acts on the inner and outer surfaces of the porous non-conductor 11, and therefore, the outer-inner surfaces of the porous non-conductor are treated and modified.

In this embodiment, theoretically, the portions which belong to outer surfaces of the porous non-conductor 11 but are brought into contact with the outer surfaces of the porous dielectric layer 47, are not treated by the plasma. Nevertheless, such contacting points actually account for extremely narrow areas in comparison with the outer surfaces, and therefore, it can be considered that all of the outer surfaces are substantially treated.

In the present invention, both dielectric layers may contain a porous dielectric portion on at least a part of the surfaces opposite to each other. Further, one of or both of the dielectric layers in the embodiments as shown in FIGS. 2 to 6 may contain a porous dielectric portion on at least a part of the surfaces opposite to each other.

EXAMPLES

The present invention will now be further illustrated by, but is by no means limited to, the following Examples.

Example 1

A non-woven fabric (thickness=0.3 mm; void rate=80%; average pore size=9 μm; permeability=15.3 ml/cm$^2$·sec) prepared by wet-laying polypropylene/polyethylene dividable fibers and hydro-entangling the whole to thereby divide and entangle fibers was used as the porous non-conductive article to be treated.

The surface-treatment was carried out using an apparatus as shown in FIG. 1. More particularly, the dielectric layers 41, 42 of polyester film were placed on the aluminum electrodes 21, 22. The electrodes were 100 mm×150 mm in size. The non-woven fabric was cut to the same size.

The non-woven fabric sheet 11 was sandwiched between the polyester film dielectric layers 41, 42, and an AC (voltage=4 KVp; current=25 mA; frequency=3 KHz) was applied to the electrodes 21, 22 from the AC supply 51, to generate the discharge. The treatment was carried out for 30 seconds under an atmospheric pressure.

Very little wetting of the non-woven fabric was obtained prior to the treatment, whereas even the insides of the treated non-woven fabric was wetted, immediately after being dipped in water.

Example 2

The non-woven fabric used in Example 1 was used in this Example.

The surface-treatment was carried out using an apparatus as shown in FIG. 6. More particularly, an endless belt was prepared by laminating a polyester film 44 carrying an aluminum-metallized layer 23 on a surface and a chloroprene rubber sheet 43 (thickness=2 mm) so that the aluminum-metallized layer became an inner layer. The endless belt was mounted on a pair of rollers 92a, 92b disposed separately and apart from each other. A cylindrical metal bar 21a (diameter=12 mm) which was rotatable and covered with a polytetrafluoroethylene layer 41a was disposed, and seven cylindrical metal bars having the same structure, which were rotatable and were covered with polytetrafluoroethylene layers, were disposed downstream of the conveying direction of the fabric to be treated. In the embodiment as shown in FIG. 6, five cylindrical electrodes 21a to 21e carrying the dielectric layers 41a to 41e were disposed, whereas eight cylindrical electrodes covered with the polytetrafluoroethylene layers were disposed in this Example.

The non-woven fabric (width=18 cm) was passed through the polyester film 44 and eight cylindrical metal bars 21 covered with the polytetrafluoroethylene layers 41, at a conveying rate of 0.1 m/min, so that the fabric was brought into contact with both the polyester film 44 and the polytetrafluoroethylene layers, and an AC (voltage=4 KVp; current=25 mA; frequency=3 KHz) was applied from the AC supply 51 to generate a discharge. The treatment was carried out under an atmospheric pressure.

Very little wetting of the non-woven fabric was obtained prior to the treatment, whereas even the insides of the treated non-woven fabric was wetted, immediately after being dipped in water.

Example 3

The non-woven fabric used in Example 1 was used in this Example.

The apparatus of Example 2 was used, except that a polyester film 44 carrying an aluminum-metallized layer 23 in a mesh form on a surface was used instead of the polyester film 44 carrying the aluminum-metallized layer 23 on a surface.

The non-woven fabric (width=18 cm) was passed through the polyester film 44 and eight cylindrical metal bars 21 covered with the polytetrafluoroethylene layers 41, at a conveying rate of 0.1 m/min, so that the fabric was brought into contact with both the polyester film 44 and the polytetrafluoroethylene layers, and an AC (voltage=4 KVp; current=25 mA; frequency=3 KHz) was applied from the AC supply 51 to generate a discharge. The treatment was carried out under an atmospheric pressure.

Very little wetting of the non-woven fabric was obtained prior to the treatment, whereas the treated non-woven fabric was wetted in the mesh form corresponding to the shape of the mesh electrode, immediately after being dipped in water.

Example 4

A three-layered laminate (permeability=5.56 ml/cm$^2$·sec) of three non-woven fabrics was used as the porous non-conductive article to be treated. The non-woven fabric (thickness=200 $\mu$m; void rate=70%; average pore size=7 $\mu$m) was prepared by wet-laying polypropylene/polyethylene dividable fibers and hydro-entangling the whole to thereby divide and entangle fibers.

The surface-treatment was carried out using an apparatus as shown in FIG. 1. More particularly, stainless steel plane electrodes (150 mm×300 mm) were used as the electrodes 21, 22, and polytetrafluoroethylene (PTFE) membranes (thickness=0.2 mm) were used as the dielectric layers 41, 42.

The non-woven fabric sheet 11 was sandwiched between the PTEF membranes 41, 42, and an AC (voltage=6 KVp; frequency=13 KHz; power=800 W) was applied to the electrodes from the impulse supply 51 to generate a discharge. The treatment was carried out for 1 minute under an atmospheric pressure.

The treated laminate was separated into three original non-woven fabric sheets. The ratios (O/C) of the number of oxygen atoms to the number of carbon atoms (1) in the surface (which had been in contact with the PTFE membrane when treated with a discharge) of the fabric which had been the outer layer of the laminate, and (2) in the surface of the fabric which had been the inner layer of the laminate were determined by an X-ray photoelectric spectrophotometer (ULVAC-PHI; Model 558UP; exitation source=Mg-K$\alpha$; power=300 W; voltage=15 KV; angle of emitted photoelectron against the sample=60°). The O/C ratio (A4) of the fabric which had been the outer layer was 0.113, and the O/C ratio (B4) of the fabric which had been the inner layer was 0.266. Therefore, the introducing efficiency rate (A4/B4) was 0.42. The measurement by the X-ray photoelectric spectrophotometer was carried out after argon-sputtering.

Example 5

The procedure of Example 4 was repeated, except that stainless steel plane electrodes (150 mm×300 mm) having projecting portions (2 mm×2 mm) which were aligned at 2 mm intervals lengthwise and crosswise were used instead of the stainless steel plane electrodes (150 mm×300 mm).

The treated non-woven fabric sheet included treated portions which had been sandwiched between the projected portions of the electrodes, and untreated portions which had not been sandwiched therebetween. The treated laminate was separated into three original non-woven fabric sheets. The ratios (O/C) of oxygen atoms to carbon atoms (1) in the surface (which had been in contact with the PTFE membrane when treated with a discharge) of the fabric which had been the outer layer of the laminate, and (2) in the surface of the fabric which had been the inner layer of the laminate were determined by an X-ray photoelectric spectrophotometer, as in Example 4. In the treated portion, the O/C ratio (A5) of the fabric which had been the outer layer was 0.120, and the O/C ratio (B5) of the fabric which had been the inner layer was 0.257. Therefore, the introducing efficiency rate (A5/B5) was 0.47. In the untreated portions, the O/C ratio of the fabric which had been the outer layer was 0, and the O/C ratio of the fabric which had been the inner layer was 0.

Example 6

In this Example, the article treated in Example 4, that is, the three-layered laminate of non-woven fabric sheets, was used as the article to be treated.

The surface-treatment was carried out using an apparatus as shown in FIG. 3. More particularly, a cylindrical stainless steel 22 (diameter=217 mm; length=500 mm) carrying an aluminum oxide layer (thickness=500 μm) as an intermediate layer, and further, a silicone rubber layer (thickness=2 mm) as an outer layer was disposed as the cylindrical electrode 22 having a larger diameter and carrying thereon the dielectric layer 42. Thus, the apparatus shown in FIG. 3 contained the electrode 22 carrying a dielectric layer 42, whereas the apparatus used in this Example contained the electrode 22 carrying two dielectric layers 42. A cylindrical stainless steel electrode 21a (diameter=20 mm; length=520 mm) carrying thereon aluminum oxide layer 41a (thickness=200 μm) was disposed as the cylindrical electrode 21a having a smaller diameter and carrying the dielectric layer 41a. Further, nine cylindrical stainless steel electrodes having the same structure, and which were covered with aluminum oxide layers were disposed downstream of the conveying direction of the laminate to be treated. In the embodiment as shown in FIG. 3, five cylindrical electrodes 21a to 21e carrying the dielectric layers 41a to 41e were disposed, whereas 10 cylindrical stainless steel electrodes covered with the aluminum oxide layers (thickness=200 μm) were disposed in this Example.

The non-woven fabric laminate was passed through the electrodes 21 and 22 at a rate of 0.5 m/min, and an AC (voltage=6 KVp; frequency=20 KHz; power=1 KW) was applied from the AC supply 51 to generate the discharge. The treatment was carried out under an atmospheric pressure.

The treated laminate was separated into three original non-woven fabric sheets. The ratios (O/C) of oxygen atoms to carbon atoms (1) in the surface (which had been in contact with the silicone rubber layer when treated with a discharge) of the fabric which had been the outer layer of the laminate, and (2) in the surface of the fabric which had been the inner layer of the laminate were determined by an X-ray photoelectric spectrophotometer, as in Example 4. The O/C ratio (A6) of the fabric which had been the outer layer was 0.203, and the O/C ratio (B6) of the fabric which had been the inner layer was 0.250. Therefore, the introducing efficiency rate (A6/B6) was 0.81.

Example 7

In this Example, the article treated in Example 4, that is, the three-layered laminate of non-woven fabric sheets, was used as the article to be treated.

The surface-treatment was carried out using an apparatus as shown in FIG. 7. More particularly, a stainless steel electrode (width=160 mm; length=210 mm) carrying a polytetrafluoroethylene sheet (width=200 mm; length=250 mm; thickness=0.1 mm) as an intermediate layer and a glass non-woven fabric sheet (width=200 mm; length=250 mm; thickness=0.2 mm; void height in thickness direction ≦100 μm) as an outer layer was disposed. Further, a stainless steel electrode (width=160 mm; length=210 mm) carrying a polytetrafluoroethylene sheet (width=200 mm; length=250 mm; thickness=0.1 mm) was disposed opposite to the above.

The non-woven fabric 11 was sandwiched between the electrodes 21, 22, and an AC (voltage=6 KVp; frequency=13 KHz; power=800 W) was applied to the electrodes from the impulse type AC supply 51 to generate the discharge. The treatment was carried out for 1 minute under an atmospheric pressure.

The treated laminate was separated into three original non-woven fabric sheets. The ratios (O/C) of oxygen atoms to carbon atoms (1) in the surface (which had been in contact with the glass non-woven fabric sheet when treated with a discharge) of the fabric which had been the outer layer of the laminate, and (2) in the surface of the fabric which had been the inner layer of the laminate were determined by an X-ray photoelectric spectrophotometer, as in Example 4. The O/C ratio (A7) of the fabric which had been the outer layer was 0.138, and the O/C ratio (B7) of the fabric which had been the inner layer was 0.255. Therefore, the introducing efficiency rate (A7/B7) was 0.54.

Example 8

A melt-blown non-woven fabric (area density=78 g/m$^2$; thickness=0.85 mm; average fiber diameter=1.8 μm; size=100 mm×150 mm; void rate=90%; average pore size of inner voids=7 μm; air permeability=7 ml/cm$^2$·sec) of polypropylene fibers was used as the article to be treated.

The surface-treatment was carried out using an apparatus as shown in FIG. 1. More particularly, plane aluminum electrodes (size=100 mm×150 mm) were used as the electrodes 21, 22, a glass plate (thickness=1 mm) was used as the dielectric layer 41, and a polyester film (thickness=50 μm) was used as the dielectric layer 42.

The non-woven fabric 11 was sandwiched between the electrodes 21, 22, and an AC [voltage pulse width (half width)=1 microsecond; pulse rise time=about 0.4 microsecond; frequency=15 KHz; peak voltage=8 KVp; power=400 W) was applied to the electrodes from the impulse type AC supply 51 to generate the discharge. The treatment was carried out for 30 seconds under an atmospheric pressure.

A hydrophilic treatment was carried out without making holes in the non-woven fabric.

Example 9

In this Example, the non-woven fabric used in Example 1 was treated.

The surface-treatment was carried out using an apparatus as shown in FIG. 1. More particularly, plane stainless steel electrodes (width=150 mm; length=300 mm) were used as the electrodes 21, 22, and polytetrafluoroethylene sheets (width=180 mm; length=350 mm; thickness=0.1 mm) were used as the dielectric layers 41, 42.

The non-woven fabric was treated under an atmospheric pressure with a discharge by applying an AC of 800 W from the impulse type AC supply 51 (frequency=13 KHz) for 1 minute, washed with water and dried.

The resulting non-woven fabric was used as a separator for an alkaline battery to prepare a cylindrical paste-paste type sealed nickel-hydrogen battery (battery capacity=1700 mAh). A positive electrode was prepared by filling a foamed nickel matrix with nickel hydroxide, and a negative electrode was prepared by filling a foamed nickel matrix with a metal hydride alloy (meshmetal MmNi$_5$). As an electrolyte, 5 g of an aqueous solution of 7.2 N potassium hydroxide/1.0 N lithium hydroxide was used. The non-woven fabric used as the separator exhibited a good absorbency of the electrolyte, and had a good workability when preparing the battery.

The battery was placed in a constant temperature bath at 20° C., and five cycles of activating the battery were carried out. The cycle consisted of a charging step at 510 mAh for 4 hours (0.3 C; 120% to the theoretical capacity), and a discharging step at 510 mAh to an end voltage of 1 V.

For the battery for which 5 cycles of activating the battery were carried out, a life test was performed by repeated charging-discharging cycles in a constant temperature bath at 20° C. A charging-discharging cycle consisted of a charging step at 1700 mAh for 1.5 hours (1.0 C; 150% to the theoretical capacity), and a discharging step at 1700 mAh to an end voltage of 0.8 V.

Figure 8:
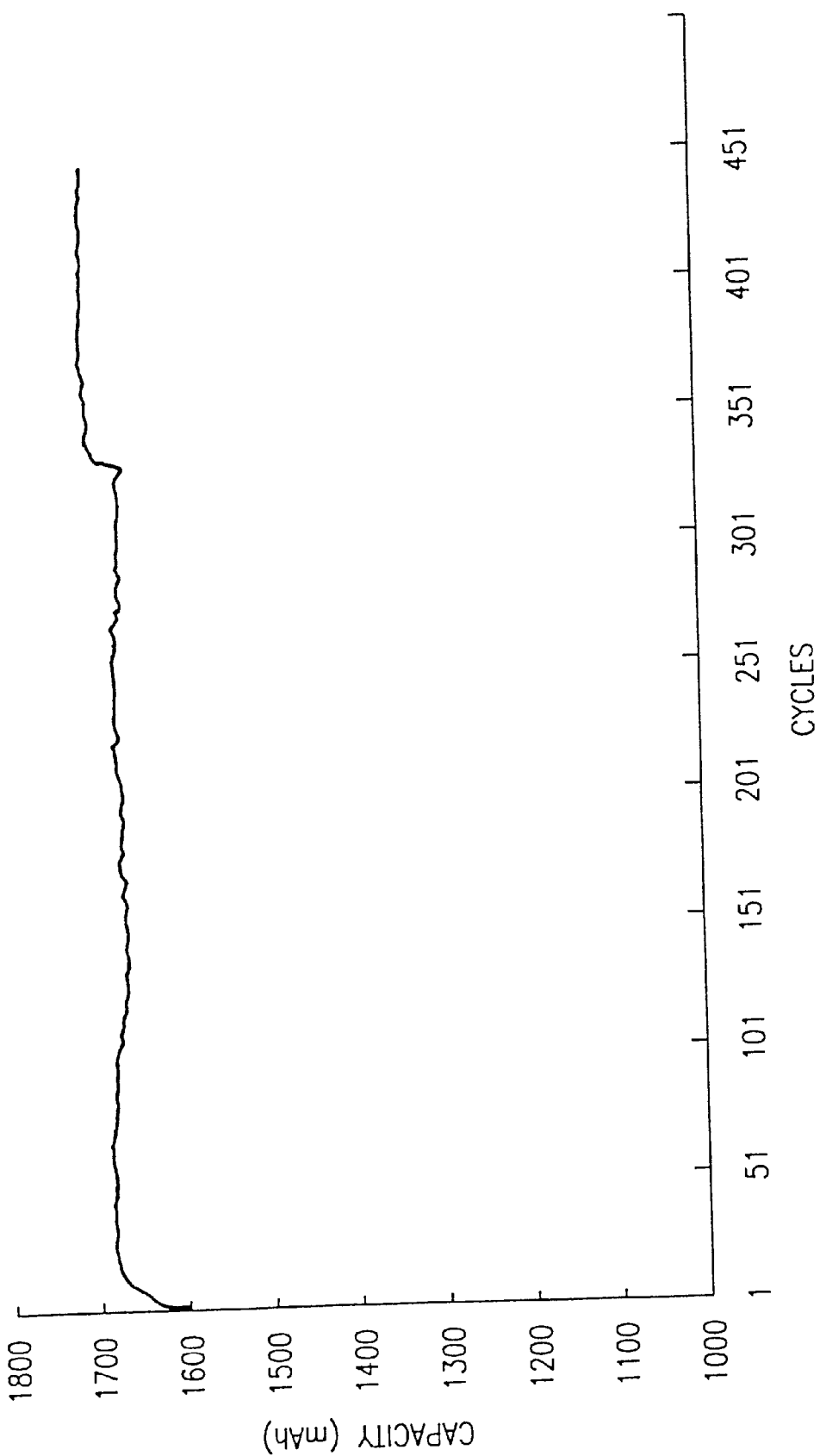
FIG. 8 is a graph illustrating a change in discharge capacities in a life test of a nickel-hydrogen battery containing a battery separator prepared in accordance with the present invention.
Figure 9:
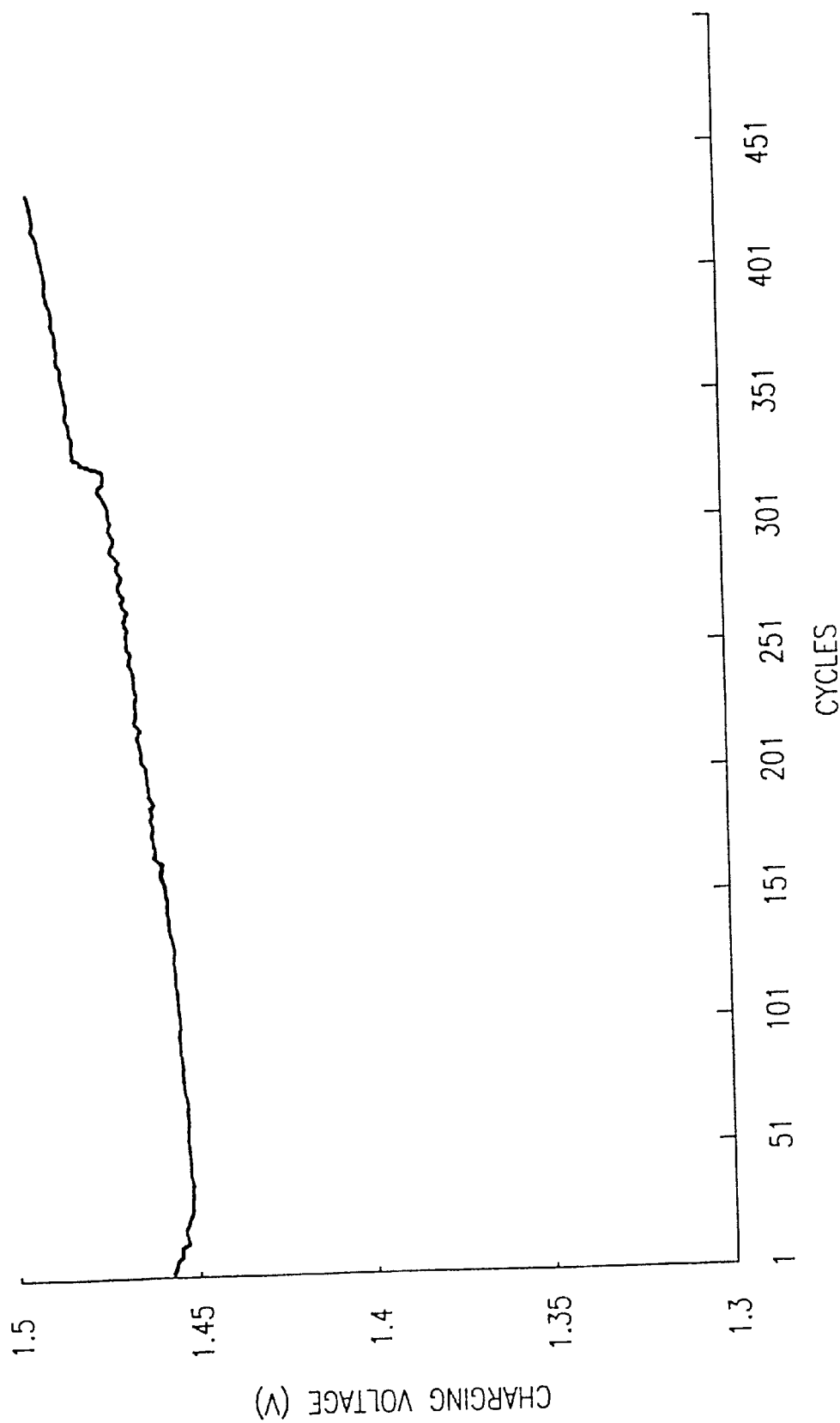
FIG. 9 is a graph illustrating a change in average voltages for charging in a life test of a nickel-hydrogen battery containing a battery separator prepared in accordance with the present invention.

FIG. 8 shows a discharge capacity after each cycle, and FIG. 9 shows a change of average charging voltages with each cycle. As apparent from FIG. 8, a reduction of the discharge capacity was not observed even after 450 cycles of charging and discharging. As apparent from FIG. 9, the charging voltage was only slightly increased. This indicates that any increase of the inner resistance would be not high, and thus the dry-out of the separator would be very little. Therefore, it is possible to prepare a battery having a long life when using the non-woven fabric treated according to the present invention as a separator.

As explained above, not only the outer surfaces but also the inner surfaces of the porous article can be treated, with very little damage to the article caused by a spark discharge or the like. Further, any kind of surface-treating gas may be used, and the outer-inner surfaces can be continuously treated.

The present invention can be carried out in atmosphere and at an atmospheric pressure without a rare gas or the like.

In the present invention, the portions sandwiched between a pair of electrodes are treated. Therefore, the outer-inner surfaces of the porous non-conductor can be selectively treated in a desired pattern, using one plane electrode and an other electrode having a shape corresponding to a desired pattern, such as a net-structure or linear structure.

The present invention may be applied to the treating of a fibrous porous article made of one or more non-conductive organic materials, particularly for treating a non-woven fabric which may be used as a separator for an alkaline battery.

Although the present invention has been described with reference to specific embodiments, various changes and modifications obvious to those skilled in the art are deemed to be within the spirit, scope, and concept of the invention.

We claim:

1. A modified porous non-conducting article comprising an exposed surface and an unexposed surface, said surfaces having been modified by introduction of functional groups into the surfaces wherein an introducing-efficiency ratio (A) of a functional group introducing efficiency (A) of the exposed surface to which the functional groups have been introduced to a functional group-introducing efficiency (B) of the unexposed surface to which the functional groups have been introduced, is from 0.4 to 0.85 ($0.45 \leq A/B \leq 0.85$).

2. The modified porous non-conducting article of claim 1 containing not more than about 95% voids.

3. The modified porous non-conducting article of claim 1 wherein the average pore size is not greater than about 0.1 mm.

4. The modified porous non-conducting article of claim 1 having an air permeability of from about 0.5 ml/cm$^2$·sec to about 200 ml/cm$^2$·sec.

5. The modified porous non-conducting article of claim 1 which is sandwiched between a pair of electrodes and when an alternating current voltage is applied, the non-conductor article has a thickness of about 0.1 mm to about 10 mm.

* * * * *

UNITED STATES PATENT AND TRADEMARK OFFICE
CERTIFICATE OF CORRECTION

PATENT NO. : 5,965,250

DATED : October 12, 1999

INVENTORS : Yasushi TAKEUCHI, Masaaki KAWABE, Hiroaki YAMAZAKI and Kazuya SATO

It is certified that error appears in the above-identified patent and that said Letters Patent is hereby as shown below:

Column 26, line 29: please delete "(A)" and insert in place thereof --(A)/(B)--

Column 26, line 24: replace "0.45" with --0.4--

Signed and Sealed this

Twenty-seventh Day of February, 2001

Attest:

NICHOLAS P. GODICI

Attesting Officer

Acting Director of the United States Patent and Trademark Office